US012769426B2

(12) United States Patent
Kim et al.

(10) Patent No.: US 12,769,426 B2
(45) Date of Patent: Oct. 20, 2026

(54) DISPLAY APPARATUS

(71) Applicant: LG Display Co., Ltd., Seoul (KR)

(72) Inventors: Won Rae Kim, Paju-si (KR); Byung Gwan Hyun, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/054,255

(22) Filed: Feb. 14, 2025

(65) Prior Publication Data

US 2025/0278153 A1 Sep. 4, 2025

(30) Foreign Application Priority Data

Feb. 29, 2024 (KR) ........................ 10-2024-0029897

(51) Int. Cl.
*G06F 3/041* (2006.01)
*G06F 3/043* (2006.01)
*G06V 40/13* (2022.01)

(52) U.S. Cl.
CPC ............ *G06F 3/043* (2013.01); *G06F 3/0412* (2013.01); *G06V 40/1306* (2022.01); *G06F 2203/04101* (2013.01)

(58) Field of Classification Search
CPC ...... G06F 3/016; G06F 3/0167; G06F 3/0412; G06F 3/043; G06F 3/0433; G06F 2203/04101; G06F 2203/04108; H10K 59/12; H10K 59/40; H10N 30/20; G06V 40/1306
See application file for complete search history.

(56) References Cited

U.S. PATENT DOCUMENTS

2012/0256848 A1* 10/2012 Madabusi Srinivasan .................. G06F 3/04883 345/173
2014/0240245 A1* 8/2014 Kim ........................ G06F 3/013 345/173
2018/0035923 A1* 2/2018 Kang ...................... H10F 39/12
2018/0203562 A1* 7/2018 An ........................ G06F 1/3231
2021/0278947 A1* 9/2021 Choi .................... G06F 3/04144
2021/0397802 A1* 12/2021 Arellano ................. G06F 3/167
2025/0093962 A1* 3/2025 Turner .................... G06F 3/011

* cited by examiner

*Primary Examiner* — Ryan A Lubit
(74) *Attorney, Agent, or Firm* — Fenwick & West LLP

(57) ABSTRACT

A display apparatus includes a display panel including a hover sensing part, and a plurality of vibration elements disposed at a rear surface of the display panel. The plurality of vibration elements may output ultrasonic waves to a hover sensing position. Thus, the display apparatus of the present specification is capable of haptic recognition upon a hover touch.

19 Claims, 17 Drawing Sheets

DISPLAY APPARATUS

CROSS-REFERENCE TO RELATED APPLICATION

This application claims priority to and the benefit of Republic of Korea Patent Application No. 10-2024-0029897 filed on Feb. 29, 2024, which is hereby incorporated by reference in its entirety.

BACKGROUND

Field

The present specification relates to a display apparatus.

Description of Related Art

With the development of the information society, the demand for display apparatuses that display images is increasing, and various types of display apparatuses are utilized, such as liquid crystal displays, organic light-emitting displays, etc.

In order to provide users with more diverse functions, the display apparatuses provide functions for recognizing a touch made by a user's finger or a stylus in contact with the display panel and performing input processing based on the recognized touch.

SUMMARY

The present specification may provide a display apparatus capable of haptic recognition upon a hover touch.

The present specification may provide a display apparatus capable of outputting sound.

The problems to be solved by the present specification are not limited to those described above, and additional objects will become apparent to those skilled in the art from the following description.

According to embodiments of the present specification, a display apparatus includes a display panel including a hover sensing part, and a plurality of vibration elements disposed at a rear surface of the display panel. The plurality of vibration elements may output ultrasonic waves to a hover sensing position of an object above the display panel, which is sensed by the hover sensing part.

According to embodiments of the present specification, a display apparatus includes a display panel; and a plurality of vibration elements disposed at a rear surface of the display panel, wherein each of the plurality of vibration elements may include a first vibration generator that outputs ultrasonic waves in an inaudible frequency range and a second vibration generator that outputs sound waves in an audible frequency range.

The display apparatus according to the present specification may be capable of haptic recognition upon a hover touch.

The display apparatus according to the present specification may output sound.

In the display apparatus according to the present specification, the vibration elements may be configured as one device, thereby enabling uni-materialization.

The effects of the present specification are not limited to the foregoing effects, and additional effects, which are not mentioned herein, will be obvious to those skilled in the art from the following description.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
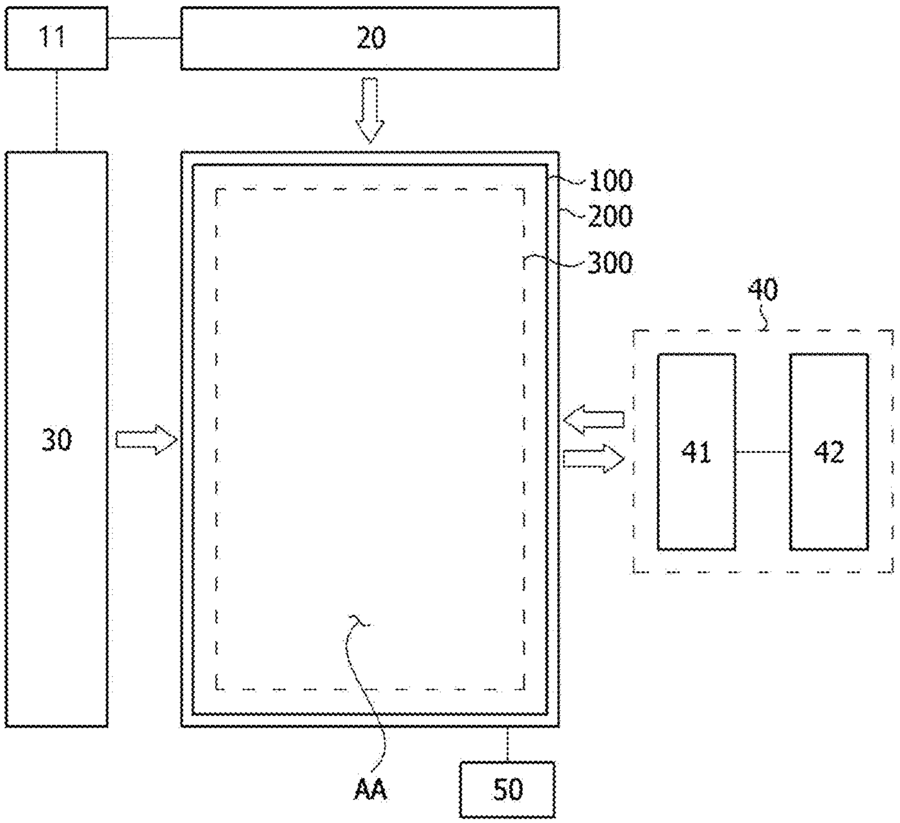
FIG. 1 is a schematic diagram illustrating a display apparatus according to an embodiment of the present specification.

The advantages and features of the present specification, and methods of achieving them will be apparent from the embodiments described in detail below in conjunction with the accompanying drawings. However, the present specification is not limited to the following embodiments disclosed herein, but may be implemented in various different forms; rather, the present embodiments are provided to make the disclosure of the present specification complete and to enable those skilled in the art to fully comprehend the scope of the present specification.

The shapes, sizes, proportions, angles, numbers, and the like of elements shown in the drawings to illustrate embodiments of the present specification are merely illustrative and are not intended to be limiting. Identical reference numerals may designate identical components throughout the description. Further, in describing the present specification, detailed descriptions of related known technologies may be omitted so as not to obscure the essence of the present specification. Terms such as "comprising," "including," or "having" as used herein are generally intended to allow for the addition of other components, unless the terms are used with the term "only." References to components of a singular noun include the plural of that noun, unless specifically stated otherwise.

In the interpretation of components, they are construed to include margins of error, even if this is not explicitly stated.

When describing a positional relationship, for example, "on top of," "above," "below," or "next to" describes the positional relationship of two parts, one or more other parts may be located between the two parts, unless "immediately" or "directly" is used.

When describing a temporal relationship, "after," "following," "next to," or "before" describes a temporal antecedent or consequent relationship, which may not be continuous unless "immediately" or "directly" is used.

The first, the second, and so on are used to describe various components, but these components are not limited by these terms. These terms are used only to distinguish one component from another. Therefore, the first component referred to below may be a second component within the technical spirit of the present specification.

Terms such as first, second, A, B, (a), or (b) may be used to describe elements of the embodiments of the present specification. Such terms are intended only to distinguish one component from another and are not intended to define the nature, sequence, order, or number of such components. When a component is described as being "connected," "coupled," or "attached" to another component, it is to be understood that the component may be directly connected or attached to the other component, but that there may also be other components "interposed" between the respective components which may be indirectly connected or attached unless not specifically stated.

It should be understood that the term "at least one" includes all possible combinations of one or more related components. For example, the meaning of "at least one of the first, second, and third components" can be understood to include not only the first, second, or third component, but also any combination of two or more of the first, second, and third components.

Figure 2:
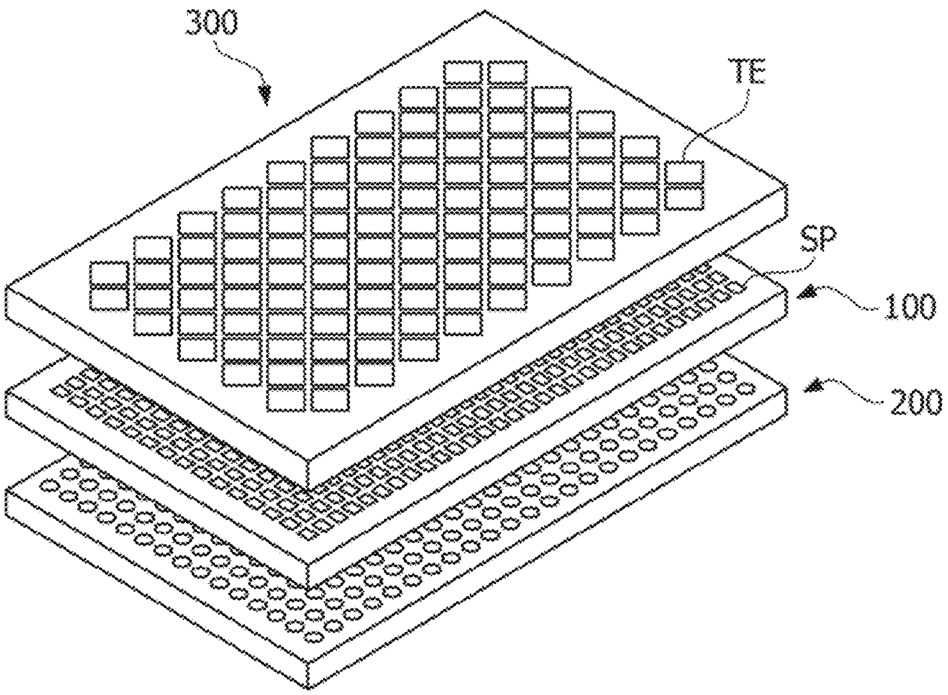
FIG. 2 is a perspective view illustrating the display apparatus according to an embodiment of the present specification.
Figure 3:
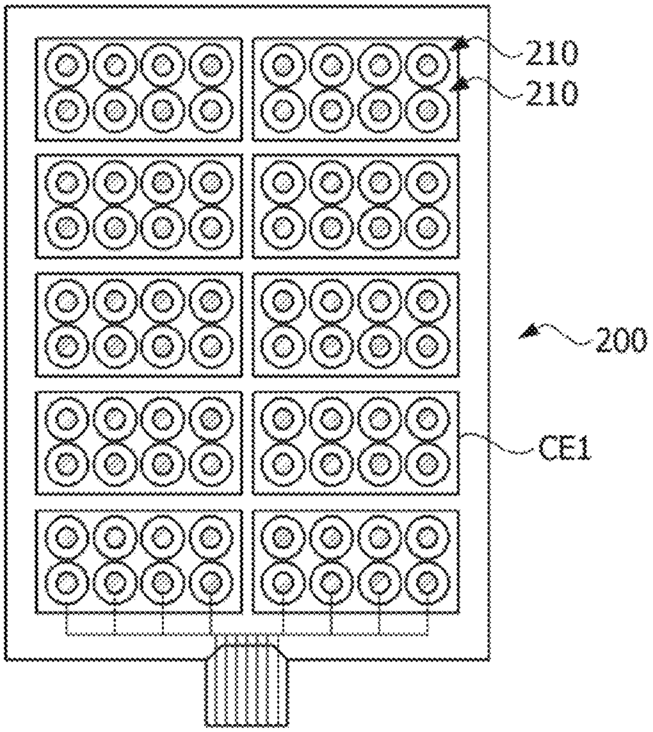
FIG. 3 is a view illustrating a vibration device of the display apparatus according to an embodiment of the present specification.

FIG. 1 is a schematic diagram illustrating a display apparatus according to an embodiment of the present specification. FIG. 2 is a perspective view illustrating the display apparatus according to an embodiment of the present specification. FIG. 3 is a view illustrating a vibration device of the display apparatus according to an embodiment of the present specification.

Referring to FIGS. 1 and 2, the display apparatus includes a touch panel 300, a display panel 100, and a vibration device 200. The display apparatus may also include a plurality of control circuits 11, 20, 30, 40, and 50 that control the touch panel 300, the display panel 100, and the vibration device 200.

The display panel 100 used in embodiments of the present specification may be any type of display panels, including liquid crystal display panels, organic light-emitting diode (OLED) display panels, and electroluminescent display panels, but embodiments of the present specification are not limited thereto. For example, the display panel 100 may be a display panel that is capable of generating sound by vibration by the vibration device according to the embodiment of the present specification. The display panel 100 applicable to the display apparatus according to the embodiment of the present specification is not limited to the shape or size of the display panel.

For example, when the display panel 100 is a liquid crystal display panel, the display panel may include multiple gate lines and data lines, and pixels formed at the intersections of the gate lines and/or the data lines. The display panel may also be composed of an array substrate having thin-film transistors as switching elements for adjusting the light transmittance at the respective pixels, a top substrate having a color filter and/or a black matrix, and a liquid crystal layer formed between the array substrate and the top substrate.

When the display panel 100 is an organic light-emitting diode display panel, the display panel may include multiple gate lines and data lines, and sub-pixels (SP) formed at intersections between the gate lines and the data lines. The display panel may also be composed of an array substrate having thin-film transistors, which are devices for selectively applying voltages to the respective sub-pixels, an organic light-emitting element (OLED) layer on the array substrate, and an encapsulation substrate disposed on the array substrate to cover the organic light-emitting element layer. An inorganic light-emitting layer, such as a nano-sized material layer, a quantum dot light-emitting layer, and the like may be formed on the array substrate, but embodiments of the present specification are not limited thereto. Other examples of the layers formed on the array substrate may include micro light-emitting diodes or mini light-emitting diodes, but embodiments of the present specification are not limited thereto.

The touch panel 300 may include a plurality of touch sensors TE to which a touch driving signal may be applied or by which a touch sensing signal may be detected, and a plurality of touch wires electrically connecting the plurality of touch sensors TE to a touch driving circuit 41.

The touch panel 300 may be disposed on the outside of the display panel 100. For example, the touch panel 300 and the display panel 100 may be made separately and combined. However, embodiments of the present specification are not limited thereto. For example, the touch panel 300 may be disposed on the inside of the display panel 100. When the touch panel 300 is disposed inside the display panel 100, a plurality of touch sensors TE and a plurality of touch wires constituting the touch panel 300 may be formed.

The plurality of control circuits may include a data driving circuit 20, a gate driving circuit 30, a timing controller 11, and the like, but embodiments of the present specification are not limited thereto.

The data driving circuit 20 may drive the plurality of data lines. The gate driving circuit 30 may drive the plurality of gate lines. The timing controller 11 may control the operations of the data driving circuit 20 and the gate driving circuit 30.

Each of the data driving circuit 20, the gate driving circuit 30, and the timing controller 11 may be implemented as one or more discrete devices, but embodiments of the present specification are not limited thereto. For example, the data driving circuit 20, the gate driving circuit 30, and the timing controller 11 may be integrated and implemented in a single device, but embodiments of the present specification are not limited thereto. For example, the data driving circuit 20 and the timing controller 11 may be implemented on a single integrated circuit chip, but embodiments of the present specification are not limited thereto.

A touch control circuit 40 may supply a touch driving signal to the touch panel 300, detect a touch sensing signal from the touch panel 300, and sense the presence or absence of a user's touch or the location of the touch (touch coordinates) on the touch panel 300 based on the detected touch sensing signal.

The touch control circuit 40 may include the touch driving circuit 41 and a touch controller 42.

The touch panel 300 according to embodiments may serve as a hover sensing part that detects a hover touch. The touch driving circuit 41 may supply the touch driving signal to the touch panel 300 and detect the touch sensing signal from the touch panel 300. The touch driving circuit 41 may apply power to generate an electric field between the touch sensors TE. The touch controller 42 may sense the presence or absence of a user's touch and/or the location of the touch based on the touch sensing signal detected by the touch driving circuit 41. The touch controller 42 may sense a hover touch position by detecting a change in the amount of charges on the touch sensor TE.

The circuit configurations for display driving and the circuit configurations for touch sensing may each be implemented as one or more discrete devices, but embodiments of the present specification are not limited thereto. In some cases, one or more of the circuit configurations for display driving and one or more of the circuit configurations for touch sensing may be functionally integrated and implemented as a single device, but embodiments of the present specification are not limited thereto.

A vibration device 200 in which a plurality of vibration elements (which may be also referred as first vibration elements hereafter) 210 are arranged may be disposed under the display panel 100. The plurality of vibration elements 210 may be disposed in display area AA where the subpixels SP of the display panel 100 and the touch sensors TE of the touch panel 300 overlap. However, embodiments of the present specification are not limited thereto. For example, the plurality of vibration elements 210 may be arranged up to an inactive area surrounding the display area AA.

Referring to FIG. 3, the vibration device 200 may be partitioned into a plurality of cells CE1, and a plurality of vibration elements 210 may be disposed in each of the plurality of cells CE1. The size, thickness, and shape of the vibration elements 210 may be adjusted to be arranged in each cell CE1 as much as possible. The size of each vibration elements 210 may be proportional to the size of the touch sensor TE, but embodiments of the present specification are not limited thereto. For example, the thickness of each vibration element 210 may range from 5 mm to 15 mm, but embodiments of the present specification are not limited thereto.

The plurality of vibration elements 210 may vibrate the display panel 100 to generate sound. The display panel 100 may output sound in the front direction by vibrating in response to the vibration of the vibration device 200.

The plurality of vibration elements 210 may all be driven simultaneously to vibrate the display panel 100, or some of the plurality of vibration elements 210 may be selectively driven according to image information provided from the display panel 100. When some of the plurality of the vibration elements 210 are selectively driven, the display panel 100 may vibrate and output sound in some areas thereof. This ensures that an image and sound come from the same position, thereby maximizing the view's immersion. For example, in the case of an image in which a vehicle moves from left to right, the vibration elements may sequentially driven according to the movement of the vehicle to output the image. However, embodiments of the present specification are not limited thereto.

The plurality of vibration elements 210 may output a first sound wave in the audible frequency range and second sound wave in the inaudible frequency range. For example, the first sound waves may be sound waves having an audible frequency of 20 Hz to 20 kHz, but embodiments of the present specification are not limited thereto. The second sound waves may be ultrasonic waves in the frequency range of 33 kHz to 40 kHz, but embodiments of the present specification are not limited thereto. The frequency difference between the first sound wave and the second sound wave is large enough that even when the ultrasonic waves are output, there is no interference that affects the sound accompanying the image.

Each of the vibration elements 210 may output first and second sound waves together, but embodiments of the present specification are not limited thereto. Each of the vibration elements 210 may have separate vibration elements that output the first sound wave and the second sound wave, but embodiments of the present specification are not limited thereto.

The first sound waves output by the plurality of vibration elements 210 may be output as sounds to the front of the display panel 100. The second sound waves output from the plurality of vibration elements 210 may enable a user to feel a tactile sensation when the user performs a hover touch (spatial input) by outputting ultrasonic wave toward the front of the display panel 100. This may enable haptic recognition when the user hovers and touches.

The touch control circuit 40 may analyze the change in the amount of charges on the touch sensor with a preset coordinate calculation algorithm to calculate the two-dimensional coordinates of a touch input or a spatial input. The touch control circuit 40 may also calculate the height of the space from the touch panel 300 to distinguish between the touch input and the hover touch (space input).

The vibration control circuit 50 may apply power to the vibration elements 210 disposed at the coordinates of a hover touch area by the touch control circuit 40. There may be a plurality of vibration elements 210 disposed at the coordinate of the hover touch area, but embodiments of the present specification are not limited thereto. When ultrasonic waves are output to the hover touch area, the user may be able to recognize haptic.

Figure 4:
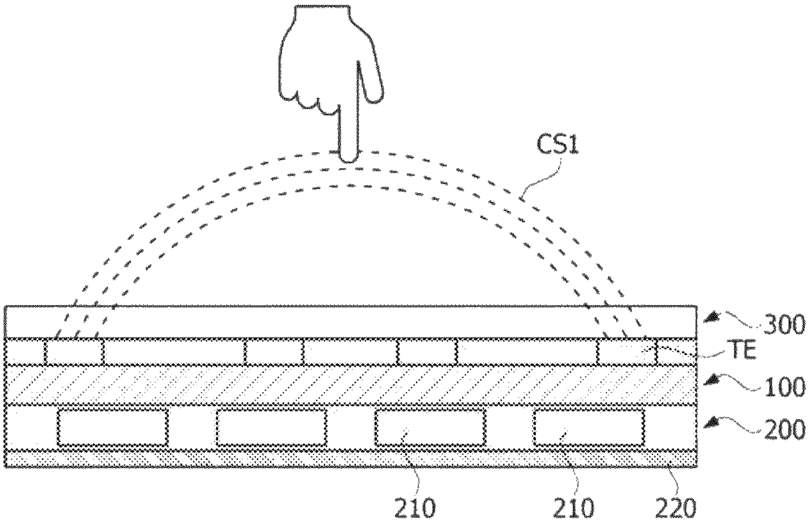
FIG. 4 is a view illustrating a state in which a hover touch is detected in the display apparatus according to an embodiment of the present specification.
Figure 5:
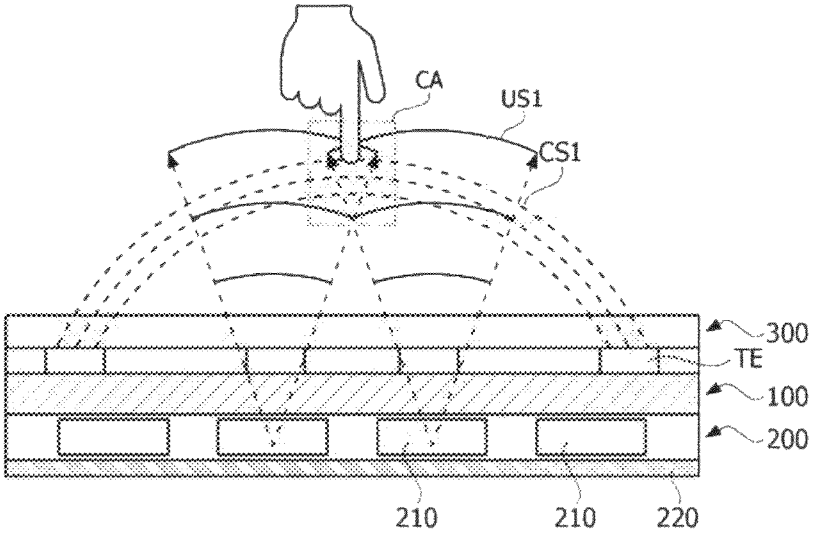
FIG. 5 is a view illustrating a state in which a haptic functionality is provided in the display apparatus according to an embodiment of the present specification.

FIG. 4 is a view illustrating a state in which a hover touch is detected in the display apparatus according to an embodiment of the present specification. FIG. 5 is a view illustrating a state in which a haptic functionality is provided in the display apparatus according to an embodiment of the present specification.

Referring to FIG. 4, the touch panel 300 may sense a hover touch through touch electrodes TE. Touch sensing and hover sensing may be performed simultaneously or alternately. For example, when a touch input is sensed through the touch panel 300 in touch sensing mode, the touch sensing mode may be maintained, and when a touch input is not sensed for a certain period of time in touch sensing mode, the touch sensing mode may be switched to hover sensing mode. For example, the touch panel 300 may operate only in hover sensing mode or may operate in hover sensing mode and then operate in touch sensing mode when a touch input is sensed, but embodiments of the present specification are not limited thereto.

In the touch sensing mode, a touch input may be sensed when a user's finger or a conductor is in contact with the touch panel 300 or at a height where a user's finger or a conductor is in close proximity to the touch panel 300. In the touch sensing mode, the touch sensor TE may generate an electric field at a low height between intersecting lines in the touch panel 300, but embodiments of the present specification are not limited thereto.

The hover sensing mode may sense spatial inputs made in the space above the touch panel 300. In the hover sensing mode, the touch sensor TE may generate the electric field CS1 at a higher height between parallel lines in the touch panel 300 than in the touch sensing mode.

If the touch panel 300 is embedded in the display panel 100 in an in-cell type, a driving period of the touch panel 300 and a display driving period may be time-divided. The touch panel 300 may operate in the touch sensing mode during the driving period of the touch panel and may operate in the hover sensing mode during the display driving period. However, embodiments of the present specification are not limited thereto. The touch sensing mode and the hover sensing mode may also be performed simultaneously.

When an object, such as a finger or a conductor, approaches the touch panel 300, at least a portion of the electric field CS1 may be blocked by the finger or conductor, resulting in a reduction of the amount of charge on the touch sensor TE. Therefore, a hover input may be sensed based on the change in the amount of charge on the touch sensor TE. However, the present specification is not limited to thereto, and various methods of hover sensing using touch sensors TE may be applied without limitation.

Referring to FIG. 5, when the position of an object is sensed by detecting the change in the amount of charge on the touch sensor TE, power may be applied to the vibration elements 210 disposed correspond to the hover sensing position among the plurality of vibration elements 210.

The vibration elements 210 to which power is applied may vibrate to output ultrasonic waves US1 toward the display panel 100. That is, the vibration elements 210 may output ultrasonic waves to a hover sensing position of an object (for example, user's finger or conductor) above the display panel 100, which is sensed by the hover sensing part. The ultrasonic waves US1 output from the respective vibration elements 210 may overlap neighboring ultrasonic waves to form a constructive interference region CA. The user may feel spatial pressure in the constructive interference region CA. Accordingly, the user may feel the tactile sensation even at a distance from the touch panel 300. The vibration device 200 may be disposed at the rear surface (or back surface) of the display panel 100 to apply ultrasonic waves. The rear surface (or back surface) may be the side opposite to the side from which the display panel outputs an image, but embodiments of the present specification are not limited thereto.

According to an embodiment, feedback may be provided to the user when the hover touch is made, and direct and sensory guidance on how far the touch is possible may be provided.

When the image output from the display panel is a stereoscopic image or an augmented reality (AR) image, it may be possible to achieve stereoscopic tactile synchronization. Based on the synchronization with large-screen TVs or new feedback devices, it may be extended to Metaverse products, but embodiments of the specification are not limited thereto.

Figure 6:
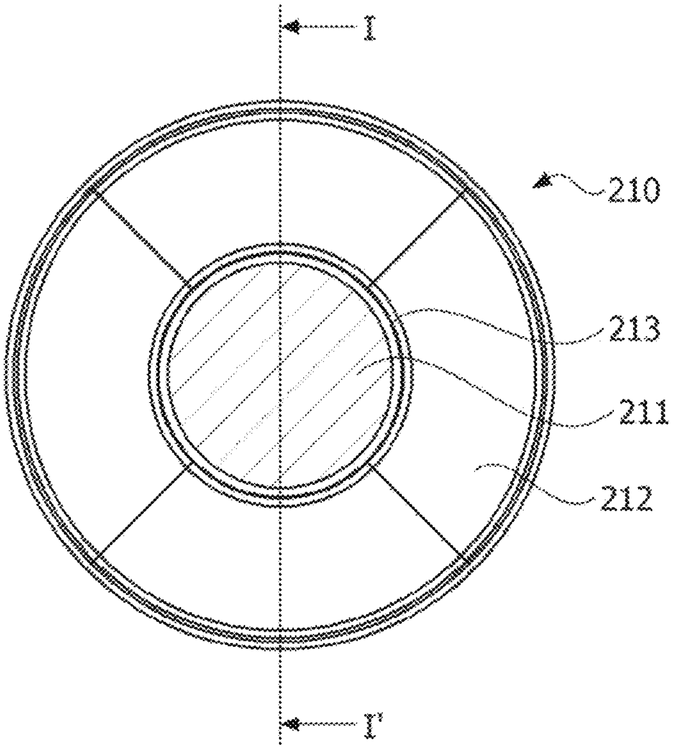
FIG. 6 is a view illustrating a first vibration element according to first embodiment of the present specification.
Figure 7:
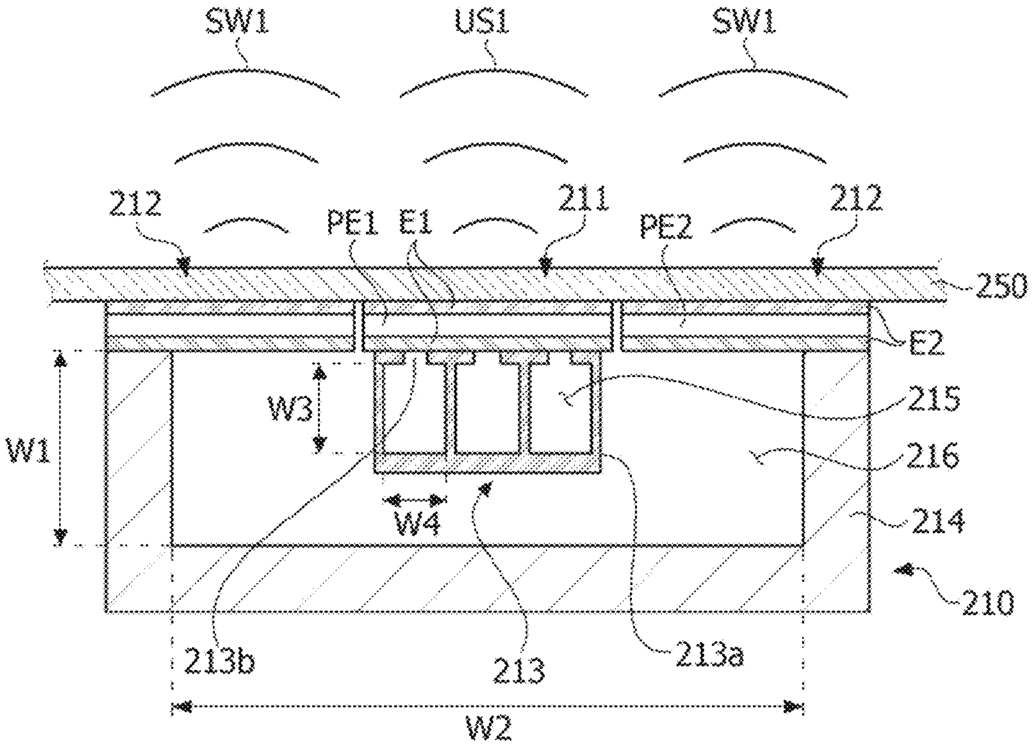
FIG. 7 is a cross-sectional view in the direction of line I-I' in FIG. 6 according to an embodiment of the present specification.
Figure 8A:
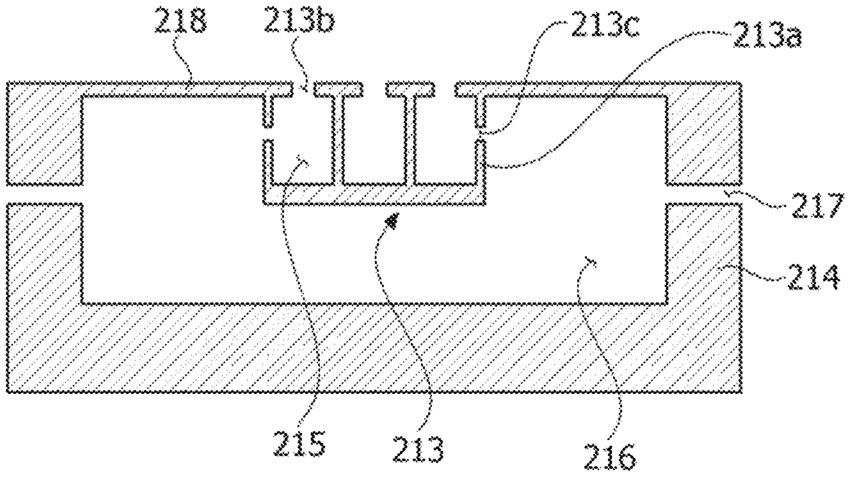
FIGS. 8A and 8B are views illustrating a housing of the first vibration element according to the first embodiment of the present specification.
Figure 8B:
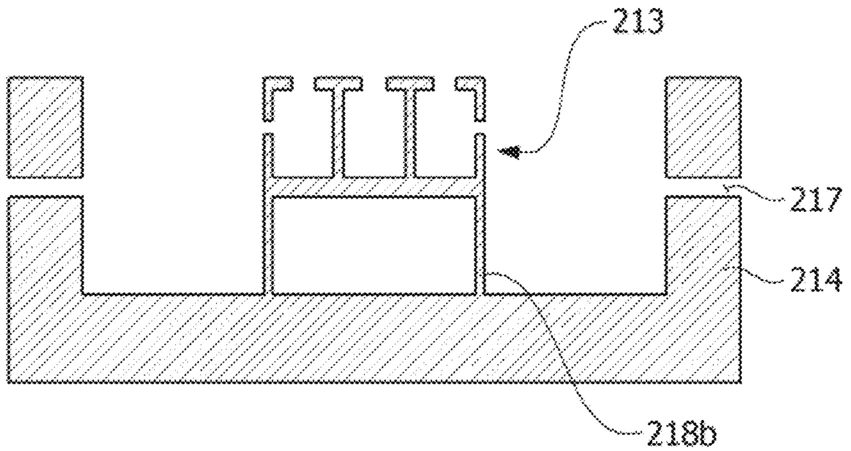

FIG. 6 is a view illustrating a first vibration element according to a first embodiment of the present specification. FIG. 7 is a cross-sectional view along line I-I' FIG. 6 according to an embodiment of the present specification. FIGS. 8A and 8B are views illustrating a housing of the first vibration element according to the first embodiment of the present specification.

Referring to FIGS. 6 and 7, a first vibration element 210 may include a first vibration generator 211 and a second vibration generator 212.

The first vibration generator 211 may output ultrasonic waves US1. The first vibration generator 211 may be disposed at a center of the first vibration element 210. For example, the first vibration generator 211 may be disposed between the second vibration generators 212. For example, the first vibration generator 211 may be a tweeter, but embodiments of the present specification are not limited thereto.

The second vibration generator 212 may output sound waves SW1 in the audible frequency range. The second vibration generator 212 may be disposed at an edge of the first vibration element 210 to surround the first vibration generator 211. However, embodiments of the present specification are not limited thereto. For example, the second vibration generator 212 may be disposed at the center of the first vibration element 210 and the first vibration generator 211 may be disposed at the edge of the first vibration element 210 to surround the second vibration generator 212. For example, the second vibration generator 212 may be a woofer or a midwoofer, but embodiments of the present specification are not limited thereto.

An area of the first vibration generator 211 may be smaller than that of the second vibration generator 212. It may be advantageous for the first vibration generator 211 to have a relatively small area to output ultrasonic waves. However, embodiments of the present specification are not limited thereto. For example, the area of the second vibration generator 212 may be equal to or smaller than the area of the first vibration generator 211.

The first vibration generator 211 may include a first vibration part PE1 and a first electrode E1 disposed on one surface and/or the other surface of the first vibration part PE1. A first housing 213, which may amplify and reflect ultrasonic waves output from the first vibration part PE1, may be disposed on the rear surface (or back surface) of the first vibration part PE1.

The first vibration part PE1 may be spaced apart from a second vibration part PE2 of the second vibration generator 212. When power is applied through the first electrode E1, the first vibration part PE1 may vibrate independently of the second vibration part PE2. The first vibration part PE1 vibrates at a high frequency, so when it is connected to the second vibration part PE2, it may affect the second vibration part PE2 when it vibrates at a high frequency.

The first vibration part PE1 and the second vibration part PE2 may be integrally formed on the connection member 250, and then patterned and separated from each other. However, embodiments of the present specification are not limited thereto. For example, the first vibration part PE1 and the second vibration part PE2 may be connected to each other in some areas.

There may be only one first vibration generator 211, but embodiments of the present specification are not limited thereto. For example, there may be a plurality of first vibration generators 211 that are spaced apart from each other.

The second vibration generator 212 may include the second vibration part PE2 and a second electrode E2 disposed on one surface and/or the other surface of the second vibrating part PE2. A second housing 214, which forms vibration space of the second vibration part PE2, may be disposed on the rear surface (or back surface) of the second vibration part PE2.

When power is applied through the second electrode E2, the second vibration part PE2 may vibrate independently of the first vibration part PE1. The second vibration part PE2 may output a first sound wave by vibrating the display panel 100.

The first housing 213 may be disposed inside the second housing 214. The first housing 213 may include a first surface facing the first vibration part PE1, a second surface opposite to the first surface, and a plurality of partition walls 213*a* connecting the first and second surfaces.

A plurality of first cavities 215 may be formed inside the first housing 213 by the plurality of partition walls 213*a*. For example, the first cavities 215 may be spaces for outputting ultrasonic waves. Opening holes 213*b* through which the ultrasonic wave from the first vibration part PE1 is introduced may be disposed on the first surface of the first housing 213. The ultrasonic wave introduced into the first cavities 215 through the opening holes 213*b* may be amplified within the first cavities 215.

The size of the first cavities 215 may be manufactured to a predetermined size so as to have a Helmholtz Resonance effect. The first cavities 215 may have a transverse length W4 of 300 μm to 800 μm and a longitudinal length W3 of 800 μm to 1200 μm, but embodiments of the present specification are not limited thereto. The first cavities 215 may have rectangular shapes in cross section, but embodiments of the present specification are not limited thereto. The width of the opening holes 213*b* may range from 200 μm to 400 μm. However, embodiments of the present specification are not limited thereto. For example, the size of the first cavities 215 may be configured to have various sizes required for ultrasonic amplification. The ultrasonic wave output by the first vibration part PE1 may be amplified by the first cavities 215 and output to the display panel 100.

The second housing 214 may be disposed under the second vibration part PE2. The second housing 214 may have a size including the first housing 213 therein. A second cavity 216 may have a longitudinal length W1 of 1 mm to 3 mm and a transverse length W2 of 5 mm to 15 mm, but embodiments of the present specification are not limited thereto. The second cavity 216 of the second housing 214 may have a size sufficient to amplify the sound wave in an audible frequency range.

The first vibration part PE1 and the second vibration part PE2 may have a property in which an electric polarization occurs to generate a potential difference when an external force is applied to them, and conversely, they may have a property in which deformation or deformation force occurs, such as a piezoelectric effect, when a voltage is applied to them. For example, the first vibration part PE1 and the second vibration part PE2 may be made of a material having piezoelectric properties among PZT ceramic containing oxides of lead monoxide (PbO), zirconium oxide ($ZrO_2$), and titanium dioxide ($TiO_2$); barium titanate ($BaTiO_3$) and ammonium hydrogen phosphate ($NH_4H_2PO_4$); or ceramic materials having a perovskite structure, but embodiments of the present specification are not limited thereto. For example, the perovskite may be, but is not limited to, calcium titanate ($CaTiO_3$) or barium titanate ($BaTiO_3$).

The piezoelectric ceramic may be composed of a single crystal ceramic having a single crystal structure or formed of a ceramic material having a polycrystalline structure or a polycrystalline ceramic. The piezoelectric material of the single crystal ceramic may include $\alpha$-$AlPO_4$, $\alpha$-$SiO_2$, $LiNbO_3$, $Tb_2(MoO_4)_3$, $Li_2B_4O_7$, or ZnO, but embodiments of the present specification are not limited thereto. The piezoelectric material of the polycrystalline ceramic may include a lead zirconate titanate (PZT)-based material including lead (Pb), zirconium (Zr), and titanium (Ti), or a lead zirconate nickel niobate (PZNN)-based material including lead (Pb), zirconium (Zr), nickel (Ni), and niobium (Nb), but the embodiments of the present specification are not limited thereto. For example, the first vibration part PE1 and the second vibration part PE2 may include at least one of $CaTiO_3$, $BaTiO_3$, and $SrTiO_3$ that does not contain lead (Pb), but embodiments of the present specification are not limited thereto.

The first electrode E1 and the second electrode E2 may be made of a transparent conductive material, a semi-transparent conductive material, or an opaque conductive material. For example, the transparent or semi-transparent conductive material may include, but is not limited to, indium tin oxide (ITO) or indium zinc oxide (IZO). The opaque conductive material may include, but is not limited to, aluminum (Al), copper (Cu), gold (Au), silver (Ag), molybdenum (Mo), or magnesium (Mg), or an alloy thereof.

The first electrode E1 may be disposed on the first surface (or top or front surface) of the first vibration part PE1, and the second electrode E2 may be disposed on the first surface (or top or front surface) of the second vibration part PE2. The first electrode E1 may have the same size as the first vibration part PE1, and the second electrode E2 may have the same size as the second vibration part PE2, or the first electrode E1 may have a smaller size than the first vibration part PE1, and the second vibration part PE2 may have a smaller size than the second vibration part PE2, but embodiments of the present specification are not limited thereto.

The first electrode E1 may be disposed on a second surface (or lower surface or back surface) that is different from or opposite to the first surface of the first vibration part PE1, and the second electrode E2 may be disposed on a second surface (or lower surface or back surface) that is different from or opposite to the first surface of the second vibration part PE2.

A signal supply member may be configured to supply driving signals supplied from a driving circuit part to the first vibration generator 211 and the second vibration generator 212. The signal supply member may be configured to be electrically connected to the first vibration generator 211 and the second vibration generator 212. The signal supply member may be electrically connected to the first electrode E2 of the first vibration generator 211 and the second electrode E2 of the second vibration generator 212.

For example, the signal supply member may be configured as a single device with the first and second vibration generators 211 and 212, thereby achieving the uni-materialization effect. For example, the signal supply member may be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present specification are not limited thereto.

The connection member 250, which secures the first vibration generator 211 and the second vibration generator 212 to the display panel 100, may be made of a material including an adhesive layer having an excellent adhesion or tackiness to the rear surface of the display panel 100. For example, the connection member 250 may include, but is not limited to, a foam pad, a double-sided foam pad, a double-sided tape, a double-sided foam tape, a double-sided adhesive, or an adhesive. For example, an adhesive layer of the connection member 250 may include, but is not limited to, an epoxy, acrylic, silicone, or urethane. This may allow the vibration of the vibration device 200 to be well transmitted to the display panel 100.

Referring to FIG. 8A, a plurality of first cavities 215 may be connected to the second cavity 216. For example, a hole or vent hole 213*c* may be formed on the first housing 213 to connect the first cavities 215 and the second cavity 216. In addition, a hole or vent hole 217 may be formed on the second housing 213 to allow outside air to enter. The pressure of the air inside the second cavity 216 may be reduced through the hole or vent hole 217, thereby improving the sound in the low frequency range.

According to an embodiment, the first housing 213 and the second housing 214 may be connected by a first support member 218. The first support member 218 may connect an upper portion of the first housing 213 to an upper portion of the second housing 214. However, embodiments of the present specification are not limited thereto. Referring to FIG. 8B, a second support member 218*b* may connect a bottom portion of the first housing 213 and a bottom portion of the second housing 214 together.

The first housing 213 and the second housing 214 may be integrally formed, but embodiments of the present specification are not limited thereto. For example, the first housing 213 and the second housing 214 may be manufactured separately and then assembled. The first housing 213 and the second housing 214 may be manufactured by ultra-precise processing or 3D printing, but embodiments of the present specification are not limited thereto.

Figure 9A:
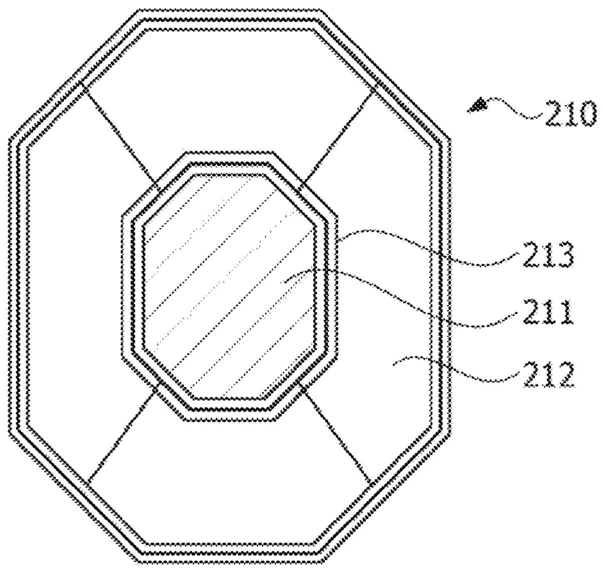
FIGS. 9A to 9C are views illustrating vibration elements having various shapes according to an embodiment of the present specification.
Figure 9B:
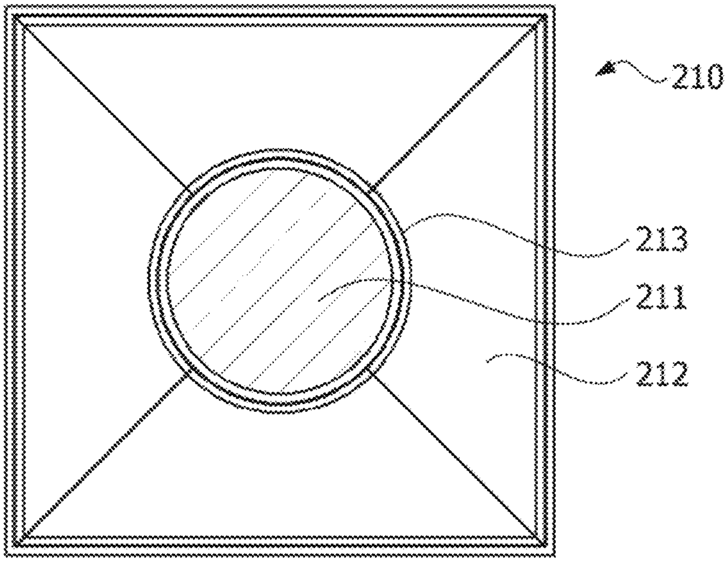
Figure 9C:
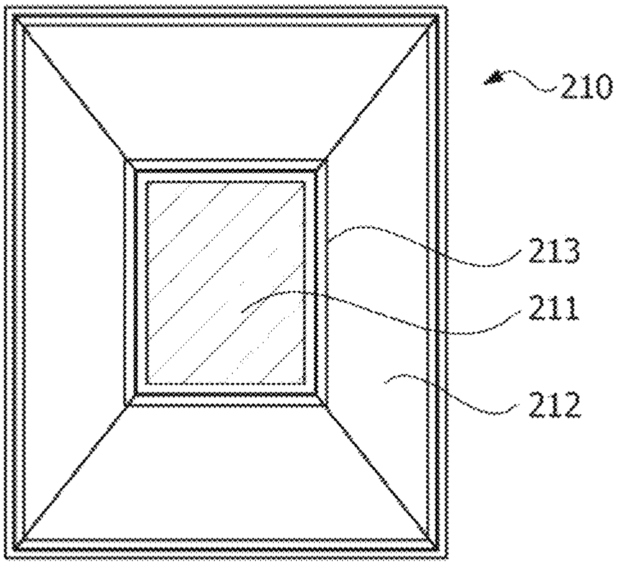

FIGS. 9A to 9C are views illustrating vibration elements of various shapes according to an embodiment of the present specification.

Referring to FIG. 9A, the vibration element 210 may have a polygonal shape, but embodiments of the present specification are not limited thereto. Both the first vibration generator 211 and the second vibration generator 212 of the vibration element 210 may have a polygonal shape, but embodiments of the present specification are not limited thereto. For example, both the first vibration generator 211 and the second vibration generator 212 may have a hexagonal shape, but embodiments of the present specification are not limited thereto.

Referring to FIG. 9B, the first vibration generator 211 and the second vibration generator 212 may have different shapes, but embodiments of the present specification are not limited thereto. For example, the first vibration generator 211 may have a circular shape and the second vibration generator 212 may have a rectangular shape, but embodiments of the present specification are not limited thereto.

Referring to FIG. 9C, both the first vibration generator 211 and the second vibration generator 212 may have a rectangular shape, but embodiments of the present specification are not limited thereto. The first vibration generator 211 may have a rectangular shape and the second vibration generator 212 may have a square shape, but embodiments of the present specification are not limited thereto. The first vibration generator 211 may have a square shape and the second vibration generator 212 may have a rectangular shape, but embodiments of the present specification are not limited thereto.

For example, the first vibration generator 211 may be a tweeter, but embodiments of the present specification are not limited thereto. For example, the second vibration generator 212 may be a woofer or a midwoofer, but embodiments of the present specification are not limited thereto.

Figure 10A:
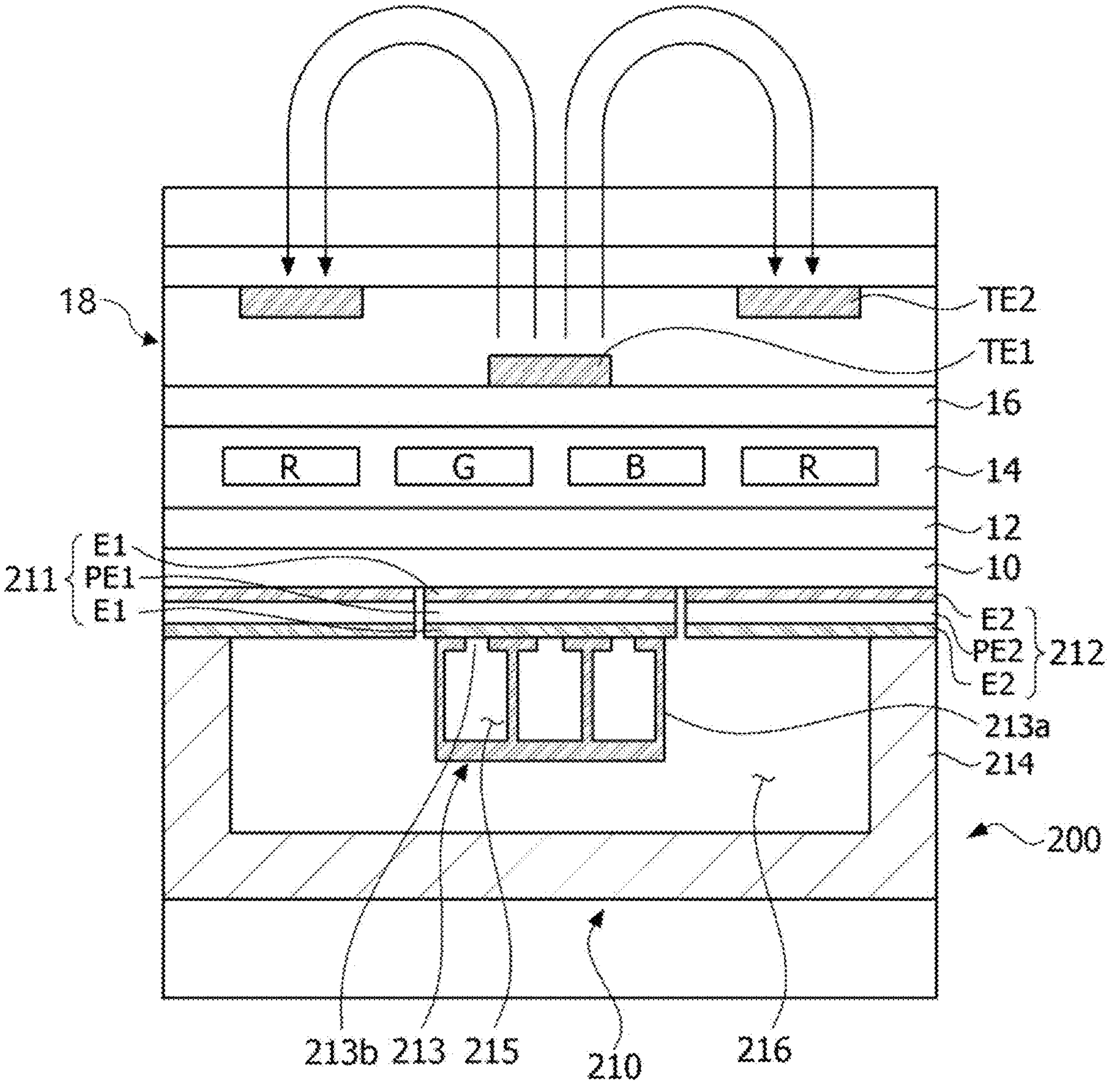
FIG. 10A is a view illustrating a cross-sectional structure of a display apparatus according to an embodiment of the present specification.
Figure 10B:
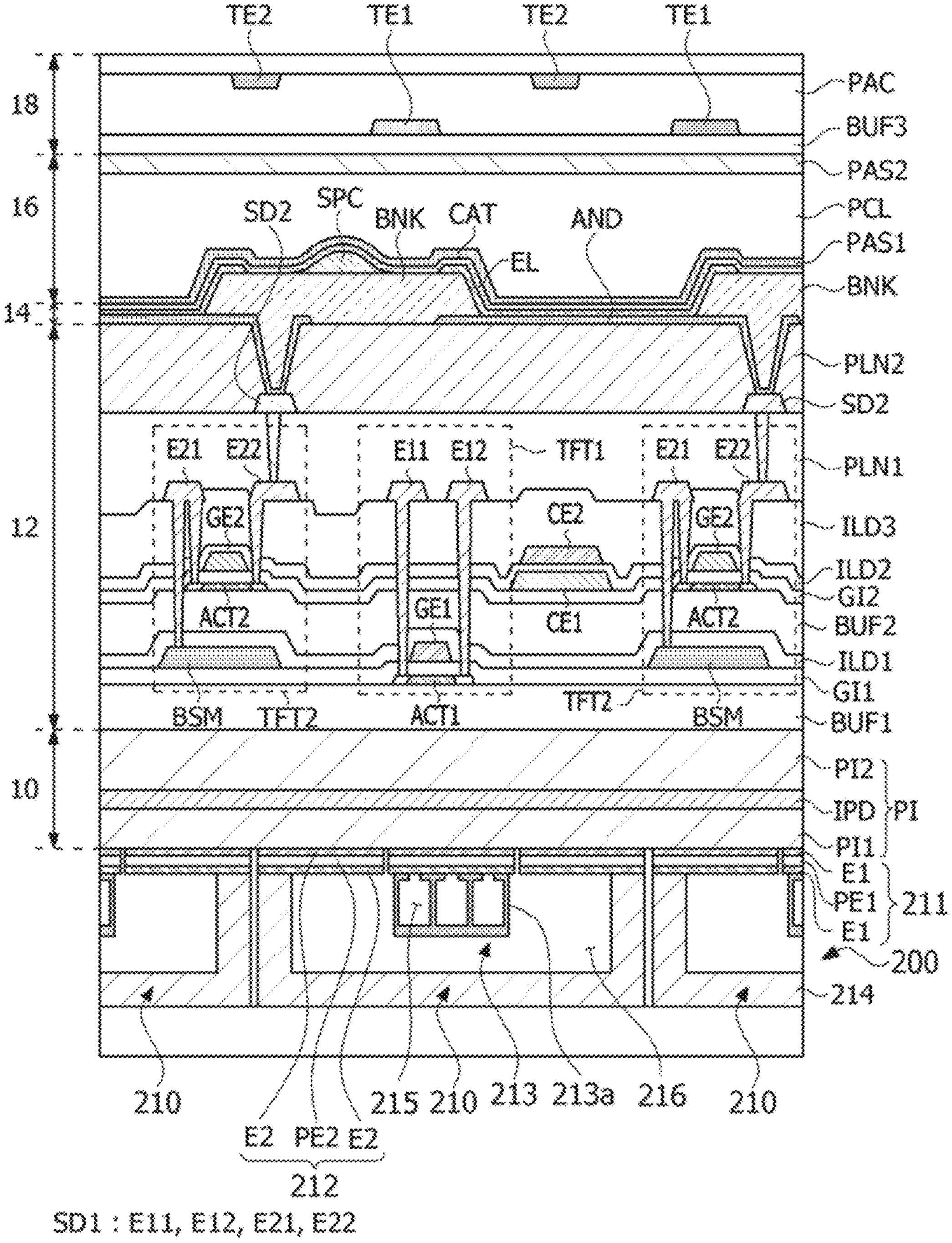
FIG. 10B is a view illustrating a cross-sectional structure of the display apparatus according to an embodiment of the present specification.

FIG. 10A is a view illustrating a cross-sectional structure of a display apparatus according to an embodiment of the present specification. FIG. 10B is a view illustrating a cross-sectional structure of the display apparatus according to an embodiment of the present specification.

Referring to FIG. 10A, the display apparatus may include the touch panel 300 (see FIGS. 2 and 4), the display panel 100 (see FIGS. 2 and 4), and the vibration device 200 including a plurality of vibration elements 210.

The touch panel 300 may form an electric field between a plurality of touch sensors TE. The height of the electric field may be adjusted according to the level applied to the touch sensors.

The vibration device 200 may be disposed under the touch panel 300 and the display panel 100 to apply power to the vibration element 210 corresponding to the hover sensing position. The vibration element 210 disposed to correspond to the hover sensing position may output an ultrasonic wave toward the front of the display panel 100 and may enable haptic recognition in the constructive interference region of the ultrasonic wave.

For example, the first vibration element 210 may include the first vibration generator 211 and the second vibration generator 212.

The first vibration generator 211 may output an ultrasonic wave. The first vibration generator 211 may be disposed at the center of the first vibration element 210. For example, the first vibration generator 211 may be disposed between the second vibration generators 212.

The first housing 213 may be disposed inside the second housing 214. The first housing 213 may include a plurality of partition walls 213*a*. A plurality of first cavities 215 may be formed inside the first housing 213 by the plurality of partition walls 213*a*. For example, the first cavities 215 may be spaces for outputting ultrasonic waves. The first housing 213 may include the opening holes 213*b* through which the ultrasonic wave from the first vibration part PE1 is introduced. The ultrasonic wave introduced into the first cavities 215 through the opening holes 213*b* may be amplified within the first cavities 215.

The second vibration generator 212 may output a sound wave in the audible frequency range. The second vibration generator 212 may be disposed at an edge of the first vibration element 210 to surround the first vibration generator 211. However, embodiments of the present specification are not limited thereto. For example, the second vibration generator 212 may be disposed at the center of the first vibration element 210 and the first vibration generator 211 may be disposed at the edge of the first vibration element 210 to surround the second vibration generator 212.

When power is applied through the second electrode E2, the second vibration part PE2 may vibrate independently of the first vibration part PE1. The second vibration part PE2 may output sound by vibrating the display panel.

The second housing 214 may be disposed under the second vibration part PE2. The second housing 214 may have a size including the first housing 213 therein. The second cavity 216 of the second housing 214 may have a size sufficient to amplify the sound wave in an audible frequency range.

The display panel 100 may include a circuit layer 12, a light-emitting element layer 14, an encapsulation layer 16, and a touch sensor layer 18 that are disposed on a substrate 10 (or a substrate PI).

The substrate 10 may be formed of an insulating material or a material with flexibility, but embodiment of the present specification is not limited thereto. For example, the substrate 10 may be made of glass, metal, or plastic, but is not limited thereto. For example, when the substrate 10 is made of alkali-free glass or non-alkali glass, it may be more impact resistant and less deformable than a plastic substrate.

The circuit layer 12 may include a pixel circuit connected to the wires such as data lines, gate lines, and power lines, and a gate driver (GIP) connected to the gate lines. In addition, the wires and the circuit elements in the circuit layer 12 may include a plurality of insulating layers, two or more metal layers separated with insulating layers therebetween, and an active layer containing a semiconductor material.

The light-emitting element layer 14 may include a plurality of light-emitting elements EL driven by the pixel circuit. The light-emitting elements EL may include, but not limited to, red light-emitting elements, green light-emitting elements, and blue light-emitting elements. In another embodiment, the light-emitting element layer 14 may include a white light-emitting element and a color filter. The light-emitting elements EL of the light-emitting element layer 14 may be covered by a protective layer including an organic film and a protective film.

The encapsulation layer 16 may cover the light-emitting element layer 14 to seal the circuit layer 12 and the light-emitting element layer 14. The encapsulation layer 16 may have a multi-insulating film structure with alternating organic and inorganic films stacked, but embodiments of the present specification are not limited thereto. The encapsulation layer 16 may block the penetration of moisture and oxygen. The encapsulation layer 16 may planarize the surface of the inorganic film. If the encapsulation layer 16 is arranged or stacked with the organic film and the inorganic film in multiple layers, the movement path of moisture or oxygen becomes longer than that of a single layer, so that penetration of moisture/oxygen affecting the light-emitting element layer 14 may be effectively blocked.

The touch sensor layer 18 may be implemented as capacitive touch sensors that sense a touch input based on the change in capacitance before and after the touch input, but embodiments of the present specification are not limited thereto. The touch sensor layer 18 may include conductor wire patterns that form the capacitance of the touch sensors TE1 and TE2.

The touch sensor layer 18 may include an organic film covering the touch sensors TE1 and TE2. The extension portion of the organic film may cover the remaining inorganic film or the substrate 10 in a bezel area of the display panel 100, for example, in the edge area.

A polarizer may be disposed on the touch sensor layer 18. The polarizer may improve visibility and contrast ratio by converting the polarization of external light reflected by the metal patterns of the circuit layer 12. The polarizer may be implemented as a polarizing plate or a circular polarizing plate in which a linear polarizing plate and a phase retardation film are bonded, but embodiments of the present specification are not limited thereto. Additionally, a cover glass may be disposed on the polarizer.

Referring to FIG. 10B, a substrate PI may include first and second substrates PI1 and PI2, but embodiments of the present specification are not limited thereto. An inorganic film IPD may be formed between the first substrate PI1 and the second substrate PI2, but embodiments of the present specification are not limited thereto. The inorganic film IPD may block the penetration of moisture from the outside.

A first buffer layer BUF1 may be formed on the second substrate PI2. The first buffer layer BUF1 may be formed of a multi-layer insulating film with two or more layers of oxide film ($SiO_2$) and nitride film (SiNx) stacked, but embodiments of the present specification are not limited thereto. A first semiconductor layer may be formed on the first buffer layer BUF1. The first semiconductor layer may include a polysilicon semiconductor layer, but embodiments of the present specification are not limited thereto. The first semiconductor layer may include a polysilicon active layer ACT1 that forms a semiconductor channel in a first thin film transistor (TFT) TFT1. For example, the first semiconductor layer may comprise one of a polysilicon semiconductor layer, a low temperature polysilicon semiconductor layer, and an oxide semiconductor layer.

A first insulating layer GI1 may be disposed on the first buffer layer BUF1. The first insulating layer GI1 may be formed on the first buffer layer BUF1 to cover the active layer ACT1 of the first semiconductor layer. The first insulating layer GI1 may include an inorganic insulating material layer, but embodiments of the present specification are not limited thereto. A first metal layer may be formed on the first insulating layer GI1. The first metal layer may be insulated from the first semiconductor layer by the first insulating layer GI1.

The first metal layer may be a single layer of metal or two or more layers of metal stacked on top of each other. The first metal layer may include a gate electrode GE1 of the first TFT TFT1, and a light shielding layer BSM under a second TFT TFT2.

A second insulating layer ILD1 may be formed on the first insulating layer GI1. The second insulating layer ILD1 may cover the first metal layer. The second insulating layer ILD1 may include an inorganic insulating material, but embodiments of the present specification are not limited thereto. A second buffer layer BUF2 may be formed on the second insulating layer ILD1. The second buffer layer BUF2 may include a single layer or a multi-layer of inorganic insulating material, but embodiments of the present specification are not limited thereto.

A second semiconductor layer may be formed on the second buffer layer BUF2. The second semiconductor layer may include a second active layer ACT2 that forms a semiconductor channel in the second TFT TFT2. A fourth insulating layer GI2 may be disposed on the second buffer layer BUF2. The fourth insulating layer GI2 may be formed or deposited on the second buffer layer BUF2 to cover the second active layer ACT2 of the second semiconductor layer. The fourth insulating layer GI2 may include a single layer or a multi-layer of inorganic insulating material, but embodiments of the present specification are not limited thereto. A second metal layer may be formed on the fourth insulating layer GI2. The second metal layer may be insulated from the second semiconductor layer by the fourth insulating layer GI2.

The second metal layer may be a single layer of metal or two or more layers of metal stacked on top of each other. The second metal layer may include a gate electrode GE2 of the second TFT TFT2, and a lower capacitor electrode CE1.

A fifth insulating layer ILD2 may be disposed on the fourth insulating layer GI2. The fifth insulating layer ILD2 may cover the second metal layer. The fifth insulating layer ILD2 may include an inorganic insulating material, but embodiments of the present specification are not limited thereto. A third metal layer may be formed on the fifth insulating layer ILD2. The third metal layer may be insulated from the second metal layer by the fifth insulating layer ILD2.

The third metal layer may be a single layer of metal or two or more layers of metal stacked on top of each other. The third metal layer may include an upper capacitor electrode CE2. A capacitor Cst of the pixel circuit may comprise the upper capacitor electrode CE2, a lower capacitor electrode CE1, and a dielectric layer between the upper capacitor electrode CE2 and the lower capacitor electrode CE1, such as the fifth insulating layer ILD2.

A sixth insulating layer ILD3 may be formed on the fifth insulating layer ILD2. The sixth insulating layer ILD3 may cover the third metal layer. The sixth insulating layer ILD3 may include a single layer or a multi-layer inorganic insulating material, but embodiments of the present specification are not limited thereto. A fourth metal layer SD1 (including E11, E12, E21 and E22) may be formed on the sixth insulating layer ILD3. The fourth metal layer may be insulated from the third metal layer by the sixth insulating layer ILD3.

The fourth metal layer E11, E12, E21 and E22 may be a single layer of metal or two or more layers of metal stacked on top of each other, but embodiments of the present specification are not limited thereto. The fourth metal layer may include the first and the second electrodes E11 and E12 of the first TFT TFT1, and the first and second electrodes E21 and E22 of the second TFT TFT2. The fourth metal layer E11, E12, E21 and E22 may be a first signal wire.

The first and second electrodes E11 and E12 of the first TFT TFT1 may be connected to the first active layer ACT1 through a first contact hole penetrating the insulating layers GI1, ILD1, BUF2, GI2, ILD2, and ILD3. The first and second electrodes E21 and E22 of the second TFT TFT2 may be connected to the second active layer ACT2 through a second contact hole penetrating the insulating layers GI2, ILD2, and ILD3. The first electrode E21 of the second TFT TFT2 may be connected to the light shielding layer BSM through a third contact hole penetrating the insulating layers ILD1, BUF2, GI2, ILD2, and ILD3. The fourth metal layers E11, E12, E21 and E22 may generate electric fields of high intensity due to voltages swinging between gate-on and gate-off voltages with large voltage differences, but embodiments of the present specification are not limited thereto.

A first planarization layer PLN1 may be disposed on the fourth metal layers E11, E12, E21 and E22. The first planarization layer PLN1 may cover the fourth metal layers E11, E12, E21 and E22. The first planarization layer PLN1 may be composed of an organic insulating material, but embodiments of the present specification are not limited thereto. The first planarization layer PLN1 may be disposed on a display area AA of the circuit layer 12. The first planarization layer PLN1 may cover the display area AA of the circuit layer 12. When the first planarization layer PLN is applied (or formed) in the circuit layer 12, the organic insulating material may flow to the edges of the display panel 100 to cover the side surfaces of the circuit layer 12 in the bezel area.

A fifth metal layer may be formed on the first planarization layer PLN1. The fifth metal layer may be insulated from the fourth metal layer by the first planarization layer PLN1. The fifth metal layer may be a single layer of metal or two or more layers of metal stacked on top of each other, but embodiments of the present specification are not limited thereto. The fifth metal layer may include a metal layer SD2 connecting the light-emitting element EL to the second TFT TFT2. The metal layer SD2 may be connected to the second electrode E22 of the second TFT TFT2 through a fourth contact hole penetrating the first planarization layer PLN1.

A second planarization layer PLN2 may be disposed on the first planarization layer PLN1. For example, the second planarization layer PLN2 may be formed on the first planarization layer PLN1 to cover the metal layers of the fifth metal layer. The second planarization layer PLN2 may be composed of an organic insulating material, but embodiments of the present specification are not limited thereto. The second planarization layer PLN2 may be disposed on the display area AA of the circuit layer 12. The second planarization layer PLN2 may cover the display area AA of the circuit layer 12. A sixth metal layer may be disposed on the second planarization layer PLN2. The second planarization layer PLN2 may planarize the surface on which the sixth metal layer is formed.

The sixth metal layer may be a single layer of metal or two or more layers of metal stacked on top of each other, but embodiments of the present specification are not limited thereto. The sixth metal layer may include an anode electrode AND of the light-emitting element EL. The anode electrode AND may be in contact with the metal layer SD2 connected to the second TFT TFT2 of the pixel circuits through a fifth contact hole penetrating the second planarization layer PLN2.

In the light-emitting element layer 14, a bank BNK may be disposed on the second planarization layer PLN2. For example, the bank BNK may be formed on the second planarization layer PLN2 to cover the edge of the anode electrode AND. The bank BNK may be formed by a pattern that separates an emission area (or an opening area) through which light pass from the respective pixels to the outside. The bank BNK may be patterned during a photolithographic process by including an organic insulating material having photosensitive properties, but embodiments of the present specification are not limited thereto. The bank BNK may be composed of a material including a black pigment or the like, or an organic material such as a benzocyclobutene resin, a polyimide resin, an acrylic resin, or a photosensitive polymer, but embodiments of the present specification are not limited thereto. If the bank BNK is composed of a material that includes a black pigment or black dye, it may be a black bank. If the bank BNK is composed of a material containing a black pigment or black dye, it may block light from the outside or reflect light from the outside, thereby further improving the luminance of the display apparatus.

A spacer SPC having a predetermined height may be disposed on the bank BNK. The bank BNK and the spacer SPC may be integrally formed of the same organic insulating material, but embodiments of the present specification are not limited thereto. The bank BNK and the spacer SPC may be formed of the same material, but embodiments of the present specification are not limited thereto. The spacer SPC may secure a gap between a fine metal mask (FMM) and the anode electrode AND so that the FMM does not contact the anode electrode AND in the deposition process of the light-emitting element EL formed of an organic compound.

A seventh metal layer used as a cathode electrode CAT of the light-emitting element EL may be disposed on the light-emitting element EL implemented by the bank BNK and the organic compound layer. The seventh metal layer may be connected between sub-pixels in the display area AA.

The encapsulation part or the encapsulation layer 16 may include one or more insulating layers covering the cathode electrode CAT of the light-emitting element EL, but embodiments of this specification are not limited thereto. The one or more insulating layers may include a first inorganic insulating layer PAS1 covering the cathode electrode CAT, an organic insulating layer PCL covering the first inorganic insulating layer PAS1, and a second inorganic insulating layer PAS2 covering the organic insulating layer PCL, but embodiments of the present specification are not limited thereto.

The touch sensor layer 18 may include a third buffer layer BUF3 covering the second inorganic insulating layer PAS2, touch sensors TE1 and TE2 formed on the third buffer layer BUF3, and an organic insulating layer PAC covering the touch sensors TE1 and TE2, but embodiments of the present specification are not limited thereto.

The vibration device 200 disposed on a lower portion of the substrate 10 may include a plurality of first vibration elements 210. For example, the first vibration element 210 may include the first vibration generator 211 and the second vibration generator 212.

The first vibration generator 211 may output an ultrasonic wave. The first vibration generator 211 may be disposed at the center of the first vibration element 210. For example, the first vibration generator 211 may be disposed between the second vibration generators 212.

The first housing 213 may be disposed inside the second housing 214. The first housing 213 may include a plurality of partition walls 213*a*. A plurality of first cavities 215 may be formed inside the first housing 213 by the plurality of partition walls 213*a*. For example, the first cavities 215 may be spaces for outputting ultrasonic waves. The first housing 213 may include the opening holes 213*b* through which the ultrasonic wave from the first vibration part PE1 is introduced. The ultrasonic wave introduced into the first cavities 215 through the opening holes 213*b* may be amplified within the first cavities 215.

The second vibration generator 212 may output a sound wave in the audible frequency range. The second vibration generator 212 may be disposed at an edge of the first vibration element 210 to surround the first vibration generator 211. However, embodiments of the present specification are not limited thereto. For example, the second vibration generator 212 may be disposed at the center of the first vibration element 210 and the first vibration generator 211 may be disposed at the edge of the first vibration element 210 to surround the second vibration generator 212.

When power is applied through the second electrode E2, the second vibration part PE2 may vibrate independently of the first vibration part PE1. The second vibration part PE2 may output sound by vibrating the display panel.

The second housing 214 may be disposed under the second vibration part PE2. The second housing 214 may have a size including the first housing 213 therein. The second cavity 216 of the second housing 214 may have a size sufficient to amplify the sound wave in an audible frequency range.

Figure 11:
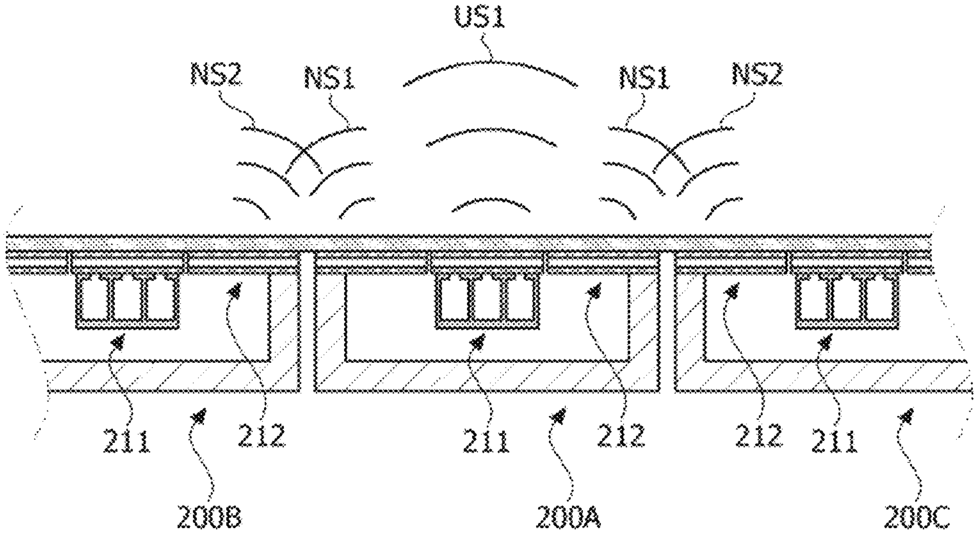
FIG. 11 is a view illustrating a state in which noise output from the vibration elements is removed according to an embodiment of the present specification.

FIG. 11 is a view illustrating a state in which noise output from the vibration elements is removed according to an embodiment of the present specification.

The first vibration element 210 may include vibration elements 200A, 200B and 200C. Referring to FIG. 11, when the vibration element 200A outputs an ultrasonic wave US1 through the first vibration generator 211, noise may also be output from the first vibration generator 211. The noise may be a sound wave of an audible frequency range. Therefore, the second vibration generators 212 of vibration elements 200B and 200C may output a compensating sound wave NS2 that is capable of cancelling out the noise sound wave NS1 when the first vibration generator 211 outputs ultrasonic waves. Thus, the acoustic performance may be improved by eliminating noise generated by the ultrasonic wave output of the first vibration element 210.

According to an embodiment, the first vibration generator 211 may output an ultrasonic wave to give haptic functionality to the hover sensing position, while the second vibration generator 212 may output a sound wave in an audible frequency range. Therefore, it is possible to output a sound related to an image at the same time as providing a spatial haptic function based on hover sensing. In this case, compensating sound waves NS2 capable of cancelling out the noise sound wave NS1 may be output from the second vibration generators 212 of the non-driven adjacent vibration elements 200B and 200C.

Figure 12:
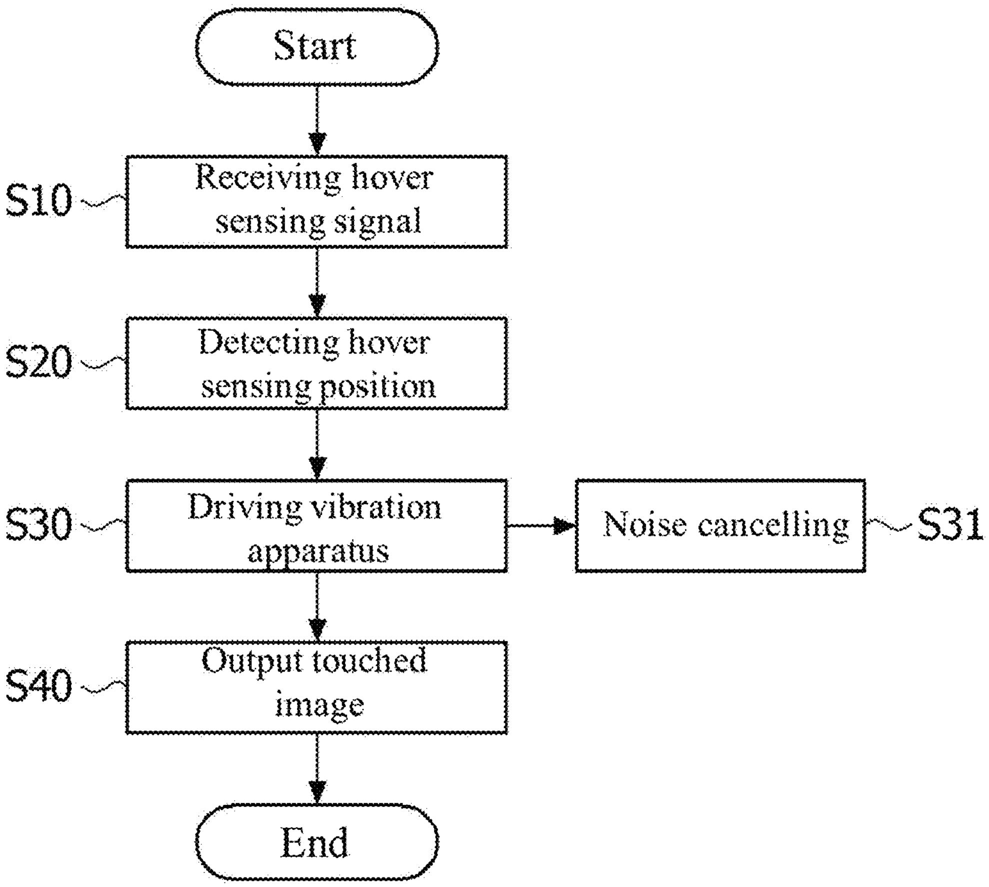
FIG. 12 is a schematic diagram illustrating a hover touch feedback method according to an embodiment of the present specification.

FIG. 12 is a schematic diagram illustrating a hover touch feedback method according to an embodiment of the present specification.

Referring to FIG. 12, the hover touch feedback method according to an embodiment of the present specification may include steps of receiving a hover sensing signal S10, detecting a hover sensing position S20, driving a vibration device S30, and outputting a touched image S40.

In the step S10 of receiving a hover sensing signal, an electric field may be formed using touch sensors of a touch panel, and when the amount of charge between the touch sensors change due to an object approaching, the change in the amount of the charges may be received. The hover sensing signal may be obtained from various hover sensing devices other than the touch panel.

In the step S20 of detecting the hover sensing position, a driving signal is applied in the first direction and the change in the amount of the charges on the touch sensor is received along the second direction, so that a two-dimensional coordinate values may be calculated. However, embodiments of the present specification are not limited thereto, and various hover touch coordinate detection algorithms may be applicable. The detection of the hover sensing position may be performed by the touch control circuit 40, but embodiments of the present specification are not necessarily limited thereto.

In the step S30 of driving the vibration device, an ultrasonic wave may be output by applying power to a vibration element disposed to correspond to a position where the hover touch is input. The ultrasonic wave output from the vibration element may create a spatial pressure by constructive interference. This enables haptic recognition at a position where the user intends to touch.

When the vibrating element outputs the ultrasonic wave, a noise sound wave may be output simultaneously. Therefore, noise may be removed by outputting a sound wave that is capable of cancelling out the noise sound wave from an adjacent vibration element (S31). However, embodiments of the present specification are not limited thereto. For example, a second vibration part of a vibration element that outputs the ultrasonic wave may simultaneously output sound waves that is capable of offsetting noise sound wave.

The coordinates of a vibration element corresponding to the hover sensing position and the coordinates of a vibration element to output a sound wave to cancel the noise may be calculated by a host system controlling the display apparatus, but embodiments of the present specification are not limited thereto. For example, the coordinates of the vibration element may be extracted by a separate controller (e.g., MCU) or a driving circuit for the vibration device.

In the step S40 of outputting the touched image, the touched image may be output at the position where the user has made a hover touch. For example, an effect image (e.g., wave, wave image) may be output to the area where the user has made a hover touch, so that the user may recognize his or her hover touch area.

Figure 13:
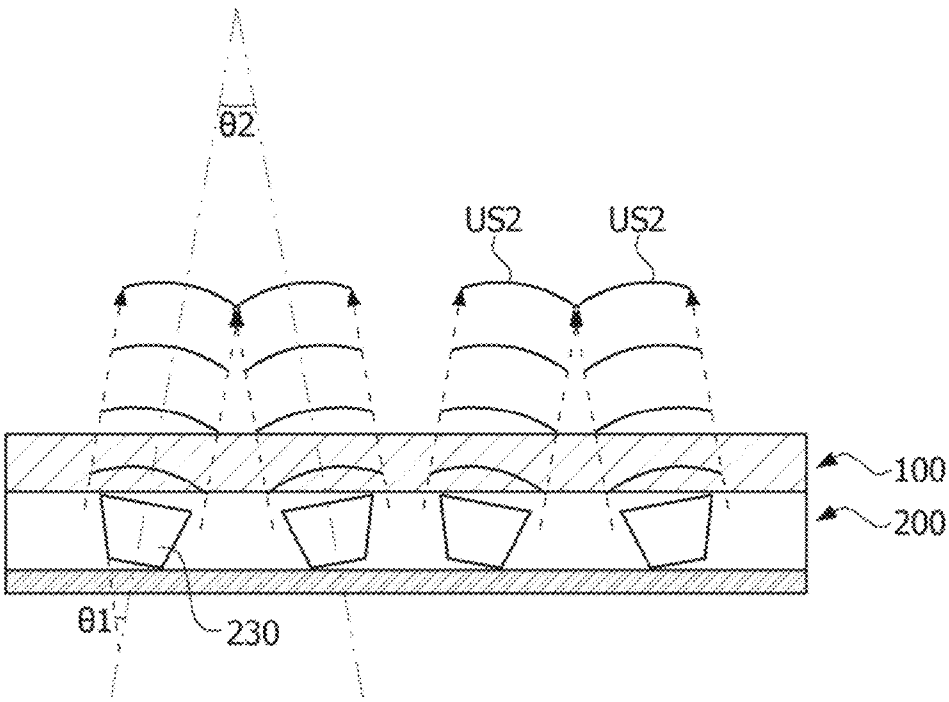
FIG. 13 is a view illustrating a display apparatus according to a second embodiment of the present specification.
Figure 14:
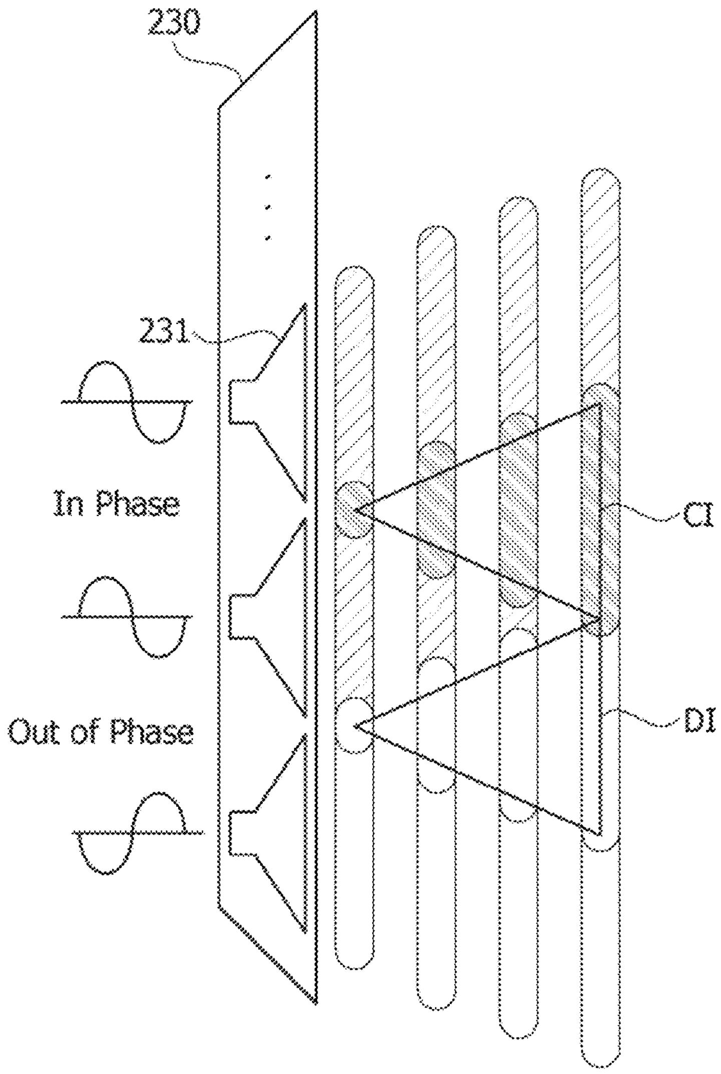
FIGS. 14 and 15 are views illustrating a second vibration element of the display apparatus according to the second embodiment of the present specification.
Figure 15:
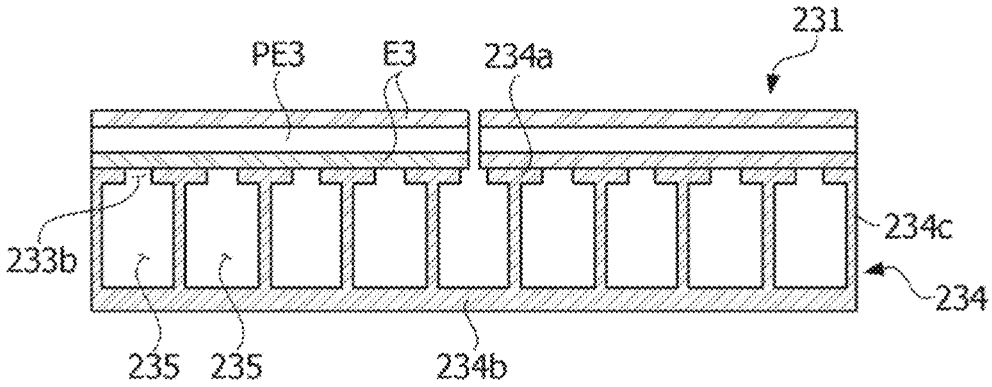
Figure 16:
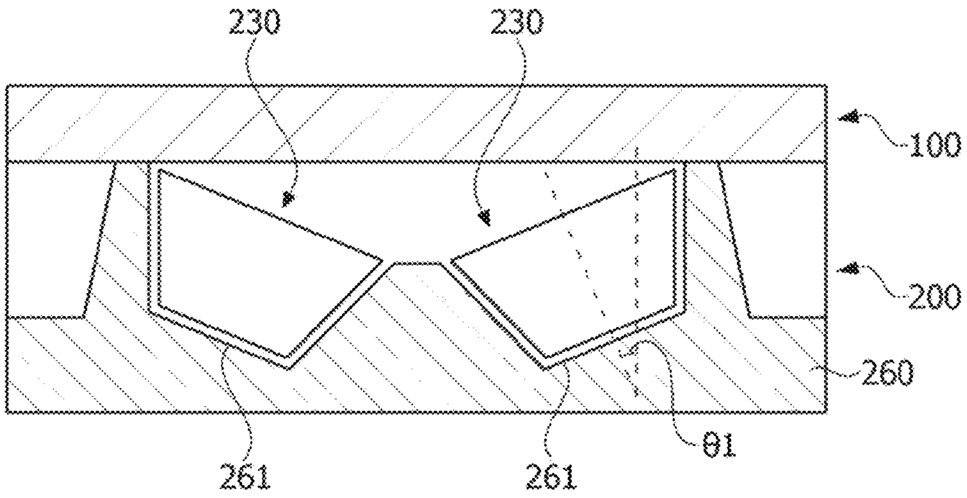
FIG. 16 is a view illustrating a structure in which the second vibration elements are arranged in the display apparatus according to the second embodiment of the present specification.

FIG. 13 is a view illustrating a display apparatus according to a second embodiment of the present specification. FIGS. 14 and 15 are views illustrating a second vibration element of the display apparatus according to the second embodiment of the present specification. FIG. 16 is a view illustrating a structure in which the second vibration elements are arranged in the display apparatus according to the second embodiment of the present specification.

Referring to FIGS. 13 and 14, a vibration element (which may be also referred as a second vibration element hereafter) 230 may output a sound wave having relatively high directivity. The directivity may be the direction of travel of the sound wave, and high directivity may mean that the sound wave travels narrowly in one direction rather than spreading out at a wide angle. Sound waves with high directivity may also be described as sound waves with a small angle of directivity. Sound waves with high directivity may travel a longer distance.

The second vibration element 230, according to the embodiment, is a super-directive element, which may output a sound wave in a specific direction. The second vibration element 230 may be a long-range acoustic device (LRAD), but embodiments of the present specification are not limited thereto.

The long-range acoustic device may generate multiple wavelengths instead of just one to form a sound wave having high directivity. In a long-range acoustic device, multiple vibration generators 231 are arranged to generate multiple wavelengths simultaneously, wherein all of the vibration generators 231 arranged at the center are supplied with signals in the same phase (in phase), causing constructive interference (CI), and the vibration generators 231 arranged at the edge are supplied with signals in the opposite phase (out of phase), causing opposite wavelengths, thereby causing destructive interference (DI). Therefore, sound waves may not spread and have a certain directivity.

According to an embodiment, the second vibration element 230 may be arranged to be inclined at a first angle θ1 with respect to a vertical axis of the display panel 100. The second vibration elements 230 which are adjacent to each other may be arranged to be inclined in opposite direction each other. Therefore, the ultrasonic wave US2 output from the second vibration elements 230 which are adjacent to each other are inclined at a predetermined angle θ2 and thus may overlap at the front of the display panel 100 to form a constructive interference region.

According to an embodiment, the height of the constructive interference region may be adjusted according to the first angle θ1 by which the adjacent second vibration elements 230 are inclined. For example, if the first angle θ1 is small, the ultrasonic wave may overlap at a point relatively far from the display panel 100 to enable the haptic recognition, and if the first angle θ1 is large, the ultrasonic waves may overlap at a point close to the display panel 100 to enable the haptic recognition.

Referring to FIG. 15, the second vibration element 230 may include a plurality of third vibration generators 231 and a third housing 234 disposed on a lower portion of the plurality of third vibration generators 231.

Each of the plurality of third vibration generators 231 may include a third vibration part PE3 and a third electrode E3 disposed on one surface and/or the other surface of the third vibrating part PE3. The third vibration generators 231 may be divided into multiple pieces because they need to be small in size to output ultrasonic waves.

The third housing 234 may include a first surface 234*a* facing the third vibration generator 231, a second surface 234*b* opposite to the first surface 234*a*, and a plurality of partition walls 234*c* connecting the first surface 234*a* and the second surface 234*b*.

A plurality of third cavities 235 may be formed inside the third housing 234 by a plurality of partition walls 234*c*. Opening holes 233*b*, through which the ultrasonic wave output from the third vibration part PE3 is introduced, may be disposed on the first surface 234*c* of the third housing 234. The ultrasonic wave introduced into the third cavities 235 through the opening holes 233*b* may be amplified within the third cavities 235.

The size of the third cavities 235 may be configured to have a predetermined size so as to have a Helmholtz resonance effect. The size of the third cavities 235 may be configured to have a variety of sizes required for ultrasonic amplification. The ultrasonic wave output from the third vibration part PE3 may be amplified by the third cavities 235 and output to the display panel 100.

Referring to FIG. 16, a plurality of second vibration elements 230 may be seated in grooves 261 provided in first members or angle adjustment members 260, respectively, for adjusting inclinations thereof. However, embodiments of the present specification are not limited thereto. The plurality of second vibration elements 230 may be formed to be inclined by adjusting the thickness of the adhesive layer attached to the substrate, but embodiments of the present specification are not limited thereto.

Figure 17:
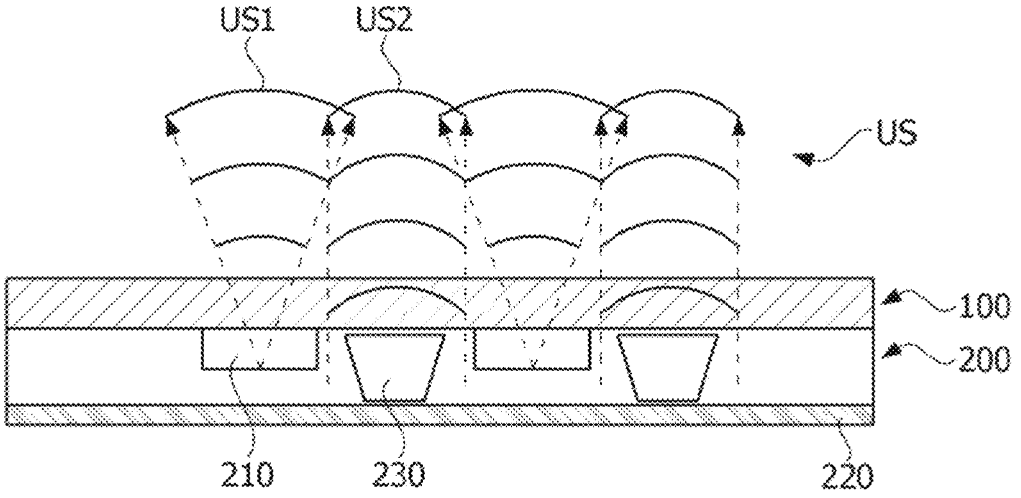
FIG. 17 is a view illustrating a display apparatus according to a third embodiment of the present specification.

FIG. 17 is a view illustrating a display apparatus according to a third embodiment of the present specification.

Referring to FIG. 17, the vibration device 200 may include a first vibration element 210 having first directivity and a second vibration element 230 having second directivity. The ultrasonic wave US1 from the first vibration element 210 spread out in the direction of travel thereof, while the ultrasonic wave US2 from the second vibration element 230 may have relatively constant directivity in the direction of travel thereof. The first vibration element 210 and the second vibration element 230 may be arranged alternately.

The second vibration element 230 may output a sound wave having relatively high directivity. The second vibration element 230, according to the embodiment, is a super-directive element, which may output a sound wave in a specific direction. The second vibration elements 230 may be long-range acoustic devices (LRAD).

As the ultrasonic wave US1 output by the first vibration element 210 spreads in the direction of travel, the ultrasonic wave US1 output by the first vibration element 210 and the ultrasonic wave US2 output by the second vibration element 230 may overlap at the front of the display panel 100. Therefore, it is possible to provide a haptic functionality when a hover detection is made.

According to embodiments, a sound wave in the audible frequency range may be output simultaneously with an ultrasonic wave from the first vibration element 210. Therefore, the haptic recognition may be possible in the hover touch area, and at the same time, a sound well-matched to an image may be output to the front of the display panel 100.

However, embodiments of the present specification are not limited thereto. For example, the first vibration element 210 may output only an ultrasonic wave, or the second vibration element 230 may output both an ultrasonic wave and a sound wave in the audible frequency range. For example, both the first vibration element 210 and the second vibration element 230 may output an ultrasonic wave and a sound wave in an audible frequency range together.

Figure 18:
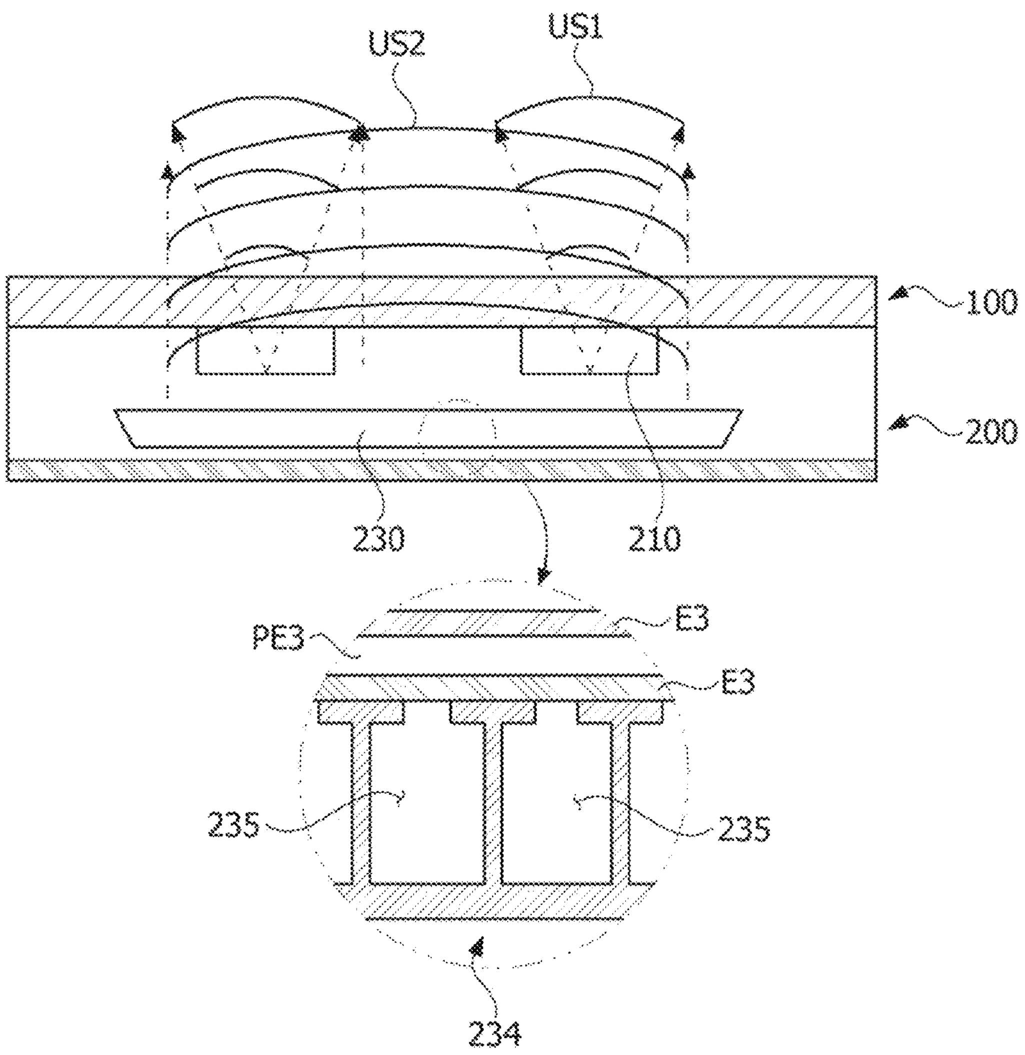
FIG. 18 is a view illustrating a display apparatus according to a fourth embodiment of the present specification.
Figure 19:
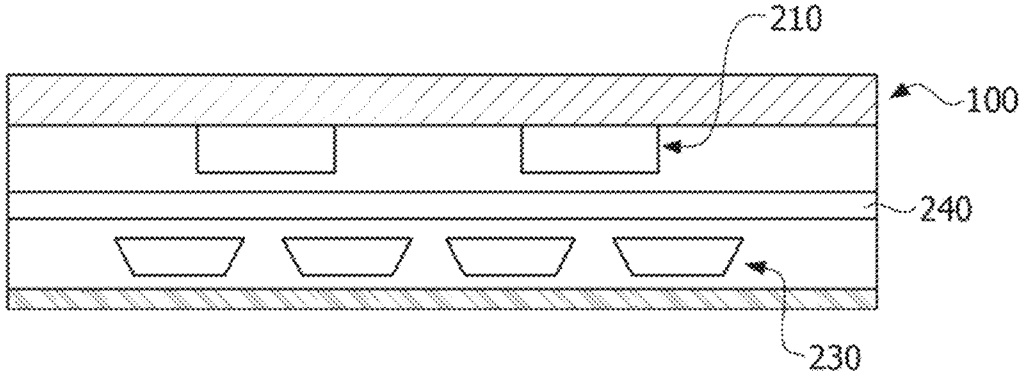
FIG. 19 is a view illustrating a structure in which the first vibration elements and the second vibration elements are arranged in the display apparatus according to the fourth embodiment of the present specification.
Figure 20:
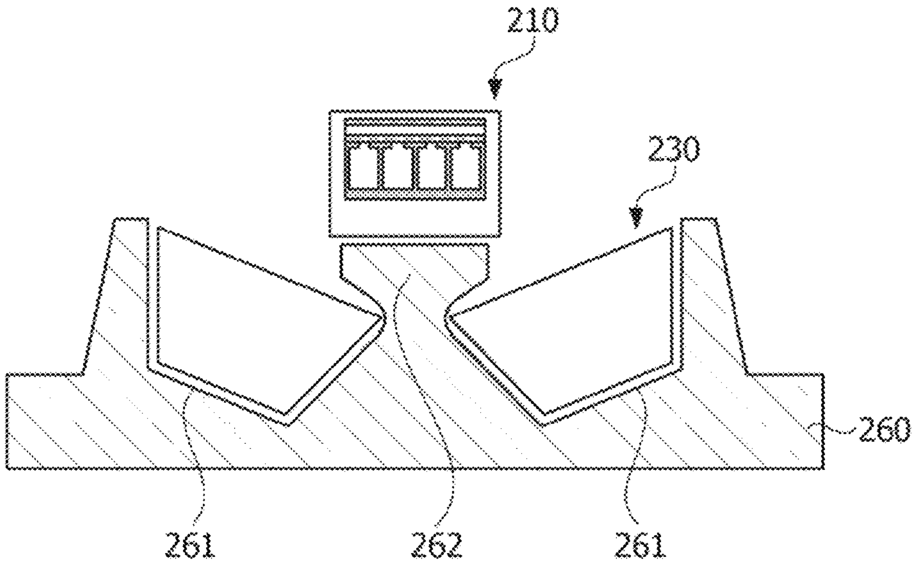
FIG. 20 is a modified example of FIG. 18 according to an embodiment of the present specification.

FIG. 18 is a view illustrating a display apparatus according to a fourth embodiment of the present specification. FIG. 19 is a view illustrating a structure in which the first vibration elements and the second vibration elements are arranged in the display apparatus according to the fourth embodiment of the present specification. FIG. 20 is a modified example of FIG. 18 according to an embodiment of the present specification.

Referring to FIG. 18, the vibration device 200 may include a first vibration element 210 having first directivity and a second vibration element 230 having second directivity. The ultrasonic wave US1 from the first vibration element 210 spread out in the direction of travel thereof, while the ultrasonic wave US2 from the second vibration element 230 may have relatively constant directivity in the direction of travel thereof.

The first vibration element 210 may be provided in plural, and the second vibration element 230 may be disposed under a plurality of first vibration elements 210. The size of the second vibration element 230 may be formed to be large enough to overlap the plurality of first vibration elements 210, but embodiments of the present specification are not limited thereto. In this way, the ultrasonic waves US2 output from the second vibration element 230 may form constructive interference with the ultrasonic waves US1 output from the plurality of first vibration elements 210.

The first vibration element 210 may be the same or substantially the same as the structure of the first vibration element described in FIG. 7. The first vibration element 210 may include a first vibration generator that outputs an ultrasonic wave, and a second vibration generator that outputs a sound wave in an audible frequency range.

The second vibration element 230 may output a sound wave having relatively high directivity. The second vibration element 230, according to the embodiment, is a super-directive element, which may output a sound wave in a specific direction. The second vibration element 230 may be a long-range acoustic device (LRAD). The second vibration element 230 may have the same or substantially the same structure as the structure of the second vibration element described in FIG. 15, but may be larger in size.

According to an embodiment, constructive interference may occur at a portion where the ultrasonic waves US1 output from the first vibration element 210 and the ultrasonic waves US2 output from the second vibration element 230 overlap. Additionally, a sound wave in the audible frequency range may be output simultaneously with the ultrasonic wave from the first vibration element 210. Therefore, the haptic recognition may be possible in the hover touch area, and at the same time, a sound well-matched to an image may be output to the front of the display panel 100.

Referring to FIG. 19, the second vibration elements 230 may be divided into a plurality of pieces and disposed under the plurality of first vibration elements 210. The second vibration elements 230 may be configured large enough to overlap a plurality of first vibration elements, or the second vibration elements may be configured small enough to be arranged in plural, but embodiments of the present specification are not limited thereto. The first vibration elements 210 and the second vibration elements 230 may be fabricated in separate layers and attached by an adhesive layer 240. However, embodiments of the present specification are not limited thereto.

Referring to FIG. 20, a plurality of second vibration elements 230 may be seated in grooves 261 provided in first members or angle adjustment members 260, respectively, for adjusting inclinations thereof. A protrusion portion 262 on which the first vibration elements 210 is disposed may be provided between a plurality of grooves 261.

Ultrasound waves from the second vibration elements 230, which are disposed to be inclined to face each other, may overlap to form constructive interference, or ultrasonic waves from the second vibration elements 230 and ultrasonic waves from the first vibration elements 210 may overlap to form constructive interference.

However, embodiments of the present specification are not limited thereto. The plurality of second vibration elements 230 may be formed to be inclined by adjusting the thickness of an adhesive layer or the like attached to the substrate, but embodiments of the present specification are not limited thereto.

The display apparatus according to the embodiment of the present specification may be applied to or included in a mobile device, a video phone, a smart watch, a watch phone, a wearable apparatus, a foldable apparatus, a rollable apparatus, a bendable apparatus, a flexible apparatus, a curved apparatus, a sliding apparatus, a variable apparatus, an electronic notebook, an e-book, a portable multimedia player (PMP), a personal digital assistant (PDA), an MP3 player, a mobile medical device, a desktop PC, a laptop PC, a netbook computer, a workstation, a navigation system, a vehicle display apparatus, a theater display apparatus, a television, a wallpaper device, a signage device, a game device, a laptop computer, a monitor, a camera, a camcorder, a home appliances, or the like. In addition, the display apparatus according to some of the embodiments of the present specification may be applicable to an organic light-emitting lighting device or an inorganic light-emitting lighting device. When the display apparatus is applied to a lighting device, the display apparatus may serve as both a lighting device and a speaker. In addition, when the display apparatus according to some of the embodiments of the present specification is applied to a mobile device or the like, it may be one or more of a speaker, a receiver, and a haptic, but embodiments of the present specification are not limited thereto.

The display apparatus according to embodiments of the present specification may be described as follows.

A display apparatus according to embodiments of the present specification may include a display panel including a hover sensing part, and a plurality of vibration elements disposed at a rear surface of the display panel. The plurality of vibration elements may output ultrasonic waves to a hover sensing position of an object above the display panel, which is sensed by the hover sensing part.

According to embodiments of the present specification, the ultrasonic waves output from the plurality of vibration elements may create a constructive interference region at the hover sensing position.

According to embodiments of the present specification, the hover sensing part may include a touch panel having a plurality of touch sensors.

According to embodiments of the present specification, the plurality of touch sensors may calculate a hover sensing position of the object that approaches the touch panel but does not contact the touch panel. A vibration element disposed to correspond to the hover sensing position among the plurality of vibration elements may be configured to output the ultrasonic waves.

According to embodiments of the present specification, at least one of the plurality of vibration elements may include a first vibration generator that outputs ultrasonic waves, and a second vibration generator that outputs sound waves in an audible frequency range.

According to embodiments of the present specification, an area of the first vibration generator may be smaller than that of the second vibration generator.

According to embodiments of the present specification, the first vibration generator may include a first vibration part, a first electrode connected to the first vibration part, and a first housing that reflects the ultrasonic waves output from the first vibration part. The second vibration generator may include a second vibration part, a second electrode connected to the second vibration part, and a second housing that reflects the sound waves in an audible frequency range output from the second vibration part. The first housing may be disposed inside the second housing.

According to embodiments of the present specification, the first housing may include a plurality of partition walls. A plurality of first cavities may be formed between the plurality of partition walls.

According to embodiments of the present specification, the first housing may further include opening holes through which the ultrasonic wave from the first vibration part is introduced into the plurality of first cavities.

According to embodiments of the present specification, the display apparatus may further include a second cavity within the second housing; and holes through which the plurality of first cavities is connected to the second cavity.

According to embodiments of the present specification, the first vibration part may be spaced apart from the second vibration part.

According to embodiments of the present specification, the second vibration generator may be disposed to surround the first vibration generator, or the first vibration generator may be disposed to surround the second vibration generator.

According to embodiments of the present specification, at least one of the plurality of vibration elements may include a plurality vibration generators that output ultrasonic waves.

According to embodiments of the present specification, the at least one vibration element may further include a housing disposed on a lower portion of the plurality of vibration generators.

According to embodiments of the present specification, the housing may include: a plurality of partition walls; and a plurality of cavities formed between the plurality of partition walls.

According to embodiments of the present specification, the housing may further include opening holes through which the ultrasonic wave from the plurality of vibration generators is introduced into the plurality of cavities.

According to embodiments of the present specification, the at least one vibration element may be inclined with respective to a vertical axis of the display panel.

According to embodiments of the present specification, the display apparatus may further include first members in which the at least one vibration element is disposed.

According to embodiments of the present specification, the first members may include grooves, and the at least one vibration element is disposed in the grooves.

According to according to embodiments of the present specification, the plurality of vibration elements may include a first vibration element and a second vibration element. A directivity angle of the ultrasonic waves output from the first vibration element is greater than a directivity angle of the ultrasonic waves output from the second vibration element.

According to according to embodiments of the present specification, the first vibration element and the second vibration element may be arranged alternately.

According to according to embodiments of the present specification, wherein the first vibration element may be provided in plural, and the second vibration element may be disposed under a plurality of first vibration elements.

According to embodiments of the present specification, a size of the second vibration elements may be larger than that of the plurality of first vibration elements, so that the second vibration element overlaps the plurality of first vibration elements.

According to embodiments of the present specification, a display apparatus may include a display panel, and a plurality of vibration elements disposed at a rear surface of the display panel. Each of the plurality of vibration elements may include a first vibration generator that outputs ultrasonic waves in an inaudible frequency range and a second vibration generator that outputs sound waves in an audible frequency band.

According to embodiments of the present specification, an area of the first vibration generator may be smaller than the area of the second vibration generator.

According to embodiments of the present specification, the first vibration generator may include a first vibration part, a first electrode connected to the first vibration part, and a first housing that reflects the ultrasonic waves output from the first vibration part. The second vibration generator may include a second vibration part, a second electrode connected to the second vibration part, and a second housing that reflects the sound output from the second vibration part. The first housing may be disposed inside the second housing.

According to embodiments of the present specification, the first housing may include a plurality of partition walls and a plurality of first cavities configured between the plurality of partition walls.

According to embodiments of the present specification, the display apparatus may further include a second cavity inside the second housing. The display apparatus may further include holes through which the plurality of first cavities is connected to the second cavity.

According to embodiments of the present specification, the plurality of vibration elements may include a first vibration element and a second vibration element. A directivity angle of the ultrasonic waves output from the first vibration element is different from a directivity angle of the ultrasonic waves output from the second vibration element.

The present specification described above is not limited to the foregoing embodiments and the accompanying drawings, and it will be apparent to a person skilled in the art to which the present specification belongs that various substitutions, modifications, and changes may be made within the scope without departing from the technical spirit of the present specification. Therefore, the scope of the present specification is represented by the following claims, and it should be construed that all changes or modifications derived from the meaning and scope of the claims and the equivalent concept thereof are included within the scope of the present specification.

What is claimed is:

1. A display apparatus comprising:

a display panel including a hover sensing part; and a plurality of vibration elements at a rear surface of the display panel, wherein the plurality of vibration elements output ultrasonic waves to a hover sensing position of an object above the display panel, which is sensed by the hover sensing part, wherein at least one of the plurality of vibration elements includes a first vibration generator that outputs the ultrasonic waves and a second vibration generator that outputs sound waves in an audible frequency range, wherein the first vibration generator includes a first vibration part, a first electrode connected to the first vibration part, and a first housing on a rear surface of the first vibration part, wherein the second vibration generator includes a second vibration part, a second electrode connected to the second vibration part, and a second housing on a rear surface of the second vibration part.

2. The display apparatus of claim 1, wherein the ultrasonic waves output from the plurality of vibration elements create a constructive interference region at the hover sensing position.

3. The display apparatus of claim 1, wherein the hover sensing part includes a touch panel having a plurality of touch sensors.

4. The display apparatus of claim 3, wherein:

the plurality of touch sensors are configured to calculate the hover sensing position of the object that approaches the touch panel but does not contact the touch panel, and a vibration element disposed to correspond to the hover sensing position among the plurality of vibration elements is configured to output the ultrasonic waves.

5. The display apparatus of claim 1, wherein an area of the first vibration generator is smaller than an area of the second vibration generator.

6. The display apparatus of claim 5, wherein the first housing is inside the second housing.

7. The display apparatus of claim 6, wherein the first housing includes:

a plurality of partition walls; and a plurality of first cavities between the plurality of partition walls.

8. The display apparatus of claim 7, wherein the first housing further includes opening holes through which the ultrasonic waves from the first vibration part are introduced into the plurality of first cavities.

9. The display apparatus of claim 7, the display apparatus further comprising:

a second cavity within the second housing; and holes through which the plurality of first cavities are connected to the second cavity.

10. The display apparatus of claim 6, wherein the first vibration part is spaced apart from the second vibration part.

11. The display apparatus of claim 1, wherein at least one of the plurality of vibration elements includes a plurality of vibration generators that output the ultrasonic waves.

12. The display apparatus of claim 11, wherein the at least one of the plurality of vibration elements further includes a housing on a lower portion of the plurality of vibration generators.

13. The display apparatus of claim 12, wherein the housing includes:

a plurality of partition walls; and a plurality of cavities between the plurality of partition walls.

14. The display apparatus of claim 13, wherein the housing further includes opening holes through which the ultrasonic waves from the plurality of vibration generators is introduced into the plurality of cavities.

15. The display apparatus of claim 11, wherein the at least one of the plurality of vibration elements is inclined with respect to a vertical axis of the display panel.

16. The display apparatus of claim 15, further comprising:

first members in which the at least one of the plurality of vibration elements is disposed.

17. The display apparatus of claim 16, wherein the first members include grooves and the at least one of the plurality of vibration elements is in the grooves.

18. The display apparatus of claim 1, wherein:

the plurality of vibration elements includes a first vibration element and a second vibration element, and a directivity angle of the ultrasonic waves output from the first vibration element is greater than a directivity angle of the ultrasonic waves output from the second vibration element.

19. A display apparatus comprising:

a display panel including a hover sensing part; and a plurality of vibration elements at a rear surface of the display panel, wherein the plurality of vibration elements output ultrasonic waves to a hover sensing position of an object above the display panel, which is sensed by the hover sensing part, wherein at least one of the plurality of vibration elements includes a first vibration generator that outputs the ultrasonic waves and a second vibration generator that outputs sound waves in an audible frequency range, and wherein the second vibration generator surrounds the first vibration generator or the first vibration generator surrounds the second vibration generator.

* * * * *